US012185861B2

(12) United States Patent
Kim et al.

(10) Patent No.: US 12,185,861 B2
(45) Date of Patent: Jan. 7, 2025

(54) JUICE EXTRACTION DRUM AND JUICER

(71) Applicant: HUROM CO., LTD, Gyeongsangnam-do (KR)

(72) Inventors: Young Ki Kim, Gyeongsangnam-do (KR); Cha Woo Lee, Gyeongsangnam-do (KR)

(73) Assignee: HUROM CO., LTD, Gyeongsangnam-do (KR)

( * ) Notice: Subject to any disclaimer, the term of this patent is extended or adjusted under 35 U.S.C. 154(b) by 973 days.

(21) Appl. No.: 16/965,153

(22) PCT Filed: Jan. 4, 2019

(86) PCT No.: PCT/KR2019/000154
§ 371 (c)(1),
(2) Date: Jan. 7, 2021

(87) PCT Pub. No.: WO2019/156355
PCT Pub. Date: Aug. 15, 2019

(65) Prior Publication Data
US 2021/0120995 A1    Apr. 29, 2021

(30) Foreign Application Priority Data

Feb. 7, 2018    (KR) .......................... 2020180000605

(51) Int. Cl.
*A47J 19/02*    (2006.01)
*A47J 19/06*    (2006.01)
(Continued)

(52) U.S. Cl.
CPC ............. *A47J 19/025* (2013.01); *A47J 19/06* (2013.01); *B30B 9/121* (2013.01); *B30B 9/128* (2013.01);
(Continued)

(58) Field of Classification Search
CPC ...... A47J 19/025; A47J 19/023; A47J 19/027; A47J 19/06; A23N 1/02
(Continued)

(56) References Cited

U.S. PATENT DOCUMENTS 854,745 A    5/1907  King
3,866,528 A   2/1975  Montagroni
(Continued)

FOREIGN PATENT DOCUMENTS

CN    201790542 U    4/2011
CN    202760959 U    3/2013
(Continued)

OTHER PUBLICATIONS

International Search Report and Written Opinion dated Apr. 4, 2019 for Application No. PCT/KR2019/000154.
(Continued)

*Primary Examiner* — Reginald Alexander
(74) *Attorney, Agent, or Firm* — Dinsmore & Shohl LLP

(57) ABSTRACT

A juice-extracting drum includes a screw rotating inside. An inner module includes a hollow cylinder with an upper portion having the screw. A plurality of slits are formed as penetration holes having both lateral sides, an upper surface, and a lower surface along an interior circumference. An outer module is detachably coupled to the inner module, and includes a rib protruding in a radially interior direction on an interior circumference. The rib is inserted into the slit of the inner module when the outer module surrounds and combines the inner module. A predetermined fixed gap discharging juice extracted by the screw is formed lengthily in an up and down direction between the lateral side of the slit of the inner module and a lateral side of the rib of the outer module. The fixed gap is formed in a direction intersecting the screw blade.

15 Claims, 22 Drawing Sheets

(51) Int. Cl.
  *B30B 9/12* (2006.01)
  *B30B 9/14* (2006.01)
  *B30B 9/26* (2006.01)
  *A23N 1/02* (2006.01)

(52) U.S. Cl.
  CPC .................. *B30B 9/14* (2013.01); *B30B 9/26* (2013.01); *A23N 1/02* (2013.01); *A47J 19/027* (2013.01)

(58) Field of Classification Search
  USPC .................................................. 99/510, 513
  See application file for complete search history.

(56) References Cited

U.S. PATENT DOCUMENTS

| | | | |
|---|---|---|---|
| 4,905,586 A | 3/1990 | Anderson et al. | |
| 4,922,814 A * | 5/1990 | Anderson | A23N 1/003 100/98 R |
| 8,047,130 B2 | 11/2011 | Neto | |
| 11,033,047 B2 * | 6/2021 | Lien | A47J 19/025 |
| 11,291,326 B2 | 4/2022 | Kim | |
| 2008/0250942 A1 * | 10/2008 | Neto | A23N 1/003 99/510 |
| 2017/0295982 A1 | 10/2017 | Holzbauer et al. | |
| 2017/0303723 A1 | 10/2017 | Sedlmaier et al. | |
| 2020/0375386 A1 | 12/2020 | Kim et al. | |

FOREIGN PATENT DOCUMENTS

| | | |
|---|---|---|
| CN | 203885244 U | 10/2014 |
| CN | 204764924 U | 11/2015 |
| CN | 205306708 U | 6/2016 |
| CN | 205568614 U | 9/2016 |
| CN | 205625553 U | 10/2016 |
| CN | 107569082 A | 1/2018 |
| EP | 3005914 A1 | 4/2016 |
| JP | 2008104564 A | 5/2008 |
| JP | 2017-529926 A | 10/2017 |
| KR | 200210541 Y1 | 1/2001 |
| KR | 1020120012038 A | 2/2012 |
| KR | 1020120012040 A | 2/2012 |
| KR | 1020120332954 A | 4/2012 |
| KR | 1020120042606 A | 5/2012 |
| KR | 1020120050949 A | 5/2012 |
| KR | 200461811 Y1 | 8/2012 |
| KR | 10-2012-0111445 A | 10/2012 |
| KR | 101202775 B1 | 11/2012 |
| KR | 10-1343599 B1 | 12/2013 |
| KR | 2020140001499 U | 5/2014 |
| KR | 1020140115292 A | 9/2014 |
| KR | 200475273 Y1 | 11/2014 |
| KR | 1020150016812 A | 2/2015 |
| KR | 1020150028033 A | 3/2015 |
| KR | 101541829 B1 | 8/2015 |
| KR | 101548561 A | 9/2015 |
| KR | 1020160016368 A | 2/2016 |
| KR | 1020160111739 A | 9/2016 |
| KR | 200481811 Y1 | 11/2016 |
| KR | 1020160135664 A | 11/2016 |
| KR | 2020160004213 | 12/2016 |
| KR | 1020170095641 A | 8/2017 |
| KR | 10-2017-0114507 A | 10/2017 |

OTHER PUBLICATIONS

Extended European Search Report dated Sep. 24, 2021 for Application No. EP19750574.6.

* cited by examiner

JUICE EXTRACTION DRUM AND JUICER

CROSS-REFERENCE TO RELATED APPLICATION

This application claims priority to and the benefit of PCT/KR2019/000154 filed on Jan. 4, 2019 which claims priority to Korean Patent Application No. 20-2018-0000605 filed in the Korean Intellectual Property Office on Feb. 7, 2018, the entire contents of which are incorporated herein by reference.

BACKGROUND OF THE INVENTION

(a) Field of the Invention

The present invention relates to a juice-extracting drum used in a low-speed juice extractor and a juice extractor having the same. More particularly, the present invention relates to a juice-extracting drum having two modules and a juice extractor including the same.

(b) Description of the Related Art

In recent years, interest in health has been increasing in the home, and a use frequency of a juicer having a function of allowing juice to be taken from a juice-extracting target such as vegetables, grains, fruits, or the like, by an individual is increasing.

A general mode of operation of such a juicer is a method in which a juice-extracting target is pressed and squeezed, for example, by using a principle as that of milling soybeans onto a steel plate and squeezing the juice, as disclosed in Korean Patent Registration No. 793852.

For such a purpose, the juice extractor is provided with, a driver providing a torque, a drum housing having a drive shaft receiving the torque from the driver, a screw connected to the drive shaft and formed with a screw spiral to squeeze and crush the juice-extracting target by the screw spiral, and a juice-extracting drum for separating the juice produced by the screw. The driver providing a torque to the juice extractor includes a motor and a speed reducer. The motor is connected to the drive shaft to transmit torque to the screw. For such a purpose, the drive shaft penetrates a lower part of the drum housing and is connected to the screw.

In general, the juice-extracting drum has a mesh structure forming netted holes. In the case of a juice-extracting drum having a mesh structure, there is a problem in that the juice-extracting efficiency is low because it is easily blocked by debris of the juice-extracting target during the juice-extracting process. In addition, because the mesh is densely formed, there is a problem that cleaning to remove the debris of the juice-extracting target on the mesh may be difficult. Although various other filter structures may be supposed, but it is difficult to be applied to a juice extractor of a squeezing scheme using a screw, because such merely performs a simple filtrate function.

In addition, fine circular netted holes were formed in a side of the conventional netted drum to discharge the juice extracted inside the netted drum to the outside. However, if debris caught in netted holes is not fully removed, debris may decay and germs may propagate. In a conventional netted drum structure, cleaning of debris stuck in netted holes is difficult.

The above information disclosed in this Background section is only for enhancement of understanding of the background of the invention, and therefore it may contain information that does not form the prior art that is already known in this country to a person of ordinary skill in the art.

SUMMARY OF THE INVENTION

Technical Problem

An exemplary embodiment of a juice-extracting drum according to the present invention is to solve the above-described problem, and has an object to provide a juice-extracting drum where the juice-extracting drum is composed of two modules, by which, while applicable to a juice extractor of a squeezing scheme, cleaning is easy and the juice-extracting efficiency is improved.

Technical Solution

A juice-extracting drum according to an exemplary embodiment of the present invention is a juice-extracting drum that separates juice and debris of a juice-extracting target by a screw rotating inside, and may include, an inner module formed as a hollow cylinder with an upper portion open to accommodate the screw and formed with a plurality of slits formed as penetration holes having both lateral sides, an upper surface, and a lower surface along an interior circumference; and an outer module having an upper portion open to be detachably coupled to the inner module, and formed with a rib formed by protruding in a radially interior direction on an interior circumference and including a protrusion surface, an upper surface, and a lower surface, wherein the rib of the outer module is inserted into the slit of the inner module when the outer module surrounds and combines the inner module and a fixed gap discharging juice extracted by the screw is formed lengthily in an up and down direction between the lateral side of the slit of the inner module and a lateral side of the rib of the outer module, the fixed gap is formed in a direction intersecting a screw blade.

The inner module and the outer module may be formed as a cylinder of a shape that narrows downward.

Rib steps protruding in the radially interior direction may be formed at predetermined spacing in the interior circumference of the inner module.

The rib step may be formed adjacent to a lateral edge of an upstream side slit in a screw rotating direction of the slit of the inner module.

An inclined portion may be formed by cutting off the lateral edge in the slit of the inner module at a downstream side in a screw rotating direction.

The rib step may be formed on the edge of the slit preceding the screw in the rotating direction, and the inclined portion may be formed in the edge of the slit following the screw in the rotating direction.

An exterior diameter of the inner module may be smaller than an interior diameter of the inner module.

The rib step may include, a first rib step having a relatively short length and a relatively low protrusion height, and a second rib step having a relatively long length and a relatively high protrusion height.

The protrusion height of the second rib step may has a same height from the upper portion to a lower portion of the inner module, or the protrusion height of the second rib step may be formed to gradually decrease from the upper portion to the lower portion of the inner module.

The second rib step may slope downward from the upper portion to the lower portion of the inner module, and a stepped portion may be formed in a middle portion.

The first rib step may be formed adjacent to an upstream side edge of the slit with respect to a rotating direction of the screw.

A spiral guide step extending from the second rib step may be formed on a upper surface of a cyclic flange extending in the radially interior direction at a lower end of the inner module.

An exterior surface of a wide width bar in which the slit is not formed may be formed in the inner module, and a guiding surface corresponding to the exterior surface and not formed with the rib may be formed inside the outer module.

A width of the bar may be formed to be wider toward the radially interior direction, and a width of the gap formed between the slit of the inner module and the rib of the outer module may be wider toward the radially exterior direction.

A step portion may be formed in the slit of the inner module, and a width of an upper side slit may be narrower than a width of a lower side slit, with reference of the step portion.

A step portion may be formed on the rib of the outer module, and a width of a lower side rib may be wider than a width of an upper side rib, with reference of the step portion.

A space formed between an exterior circumference of the inner module and the interior circumference of the outer module may gradually widen toward a lower portion.

A juice-extracting drum according to an exemplary embodiment of the present invention may further include, a key protrusion formed in the interior circumference of the outer module, and a key formed in the inner module and configured to receive the key protrusion.

A juice-extracting drum according to an exemplary embodiment of the present invention may further include, a coupling protrusion formed in a lower end of a wide width bar of the inner module, and a coupling groove formed in a cyclic flange formed in a lower end of the outer module and coupled with the coupling protrusion.

A rib is provided in plural, and a plurality of juice outlets may be formed between the plurality of ribs of the outer module.

A juice extractor according to another exemplary embodiment of the present invention may include a drum housing accommodating a juice-extracting drum according to an exemplary embodiment of the present invention, formed with a juice discharge groove through which juice discharged from the juice outlet flows, and formed with a juice outlet communicating with the juice discharge groove, wherein the juice-extracting drum may include an inner module formed as a hollow cylinder with an upper portion open to accommodate the screw and formed with a plurality of slits formed as penetration holes having both lateral sides, an upper surface, and a lower surface along an interior circumference; and an outer module having an upper portion open to be detachably coupled to the inner module, and formed with a rib formed by protruding in a radially interior direction on an interior circumference and including a protrusion surface, an upper surface, and a lower surface, wherein the rib of the outer module is inserted into the slit of the inner module when the outer module surrounds and combines the inner module and a predetermined fixed gap discharging juice extracted by the screw is formed lengthily in an up and down direction between the lateral side of the slit of the inner module and a lateral side of the rib of the outer module, wherein the fixed gap is formed in a direction intersecting a screw blade, and wherein rib is provided in plural, and a plurality of juice outlets may be formed between the plurality of ribs of the outer module.

A debris discharge groove through which the debris squeezed between the inner module and the screw flows and a debris outlet communicating with the debris discharge groove may be formed in the drum housing.

A second flange extending in the radially interior direction may be formed in a lower end of the outer module.

A juice extractor according to another exemplary embodiment of the present invention may further include a drum hole formed on an interior bottom surface of the drum housing and a packing provided in an interior circumference of the drum hole.

A guiding step in which a lower end ring of the screw is seated may be formed around an outside of the drum hole.

In addition, at least one of the above-described respective solutions may be applied to invent a juice extractor.

Advantageous Effects

According to a juice-extracting drum applied with exemplary embodiments of the present invention and common technical ideas thereof, by forming the juice-extracting drum such that two modules may be combined, assembly and disassembly of the two modules is easy, and accordingly, the juice-extracting drum is easy to manufacture and cleaning becomes easy.

In addition, according to the exemplary embodiments of the present invention, it is possible to smoothly transfer the material by screw in the squeezing process, to increase the juice-extracting rate through fine crush and squeeze of the material, and to smoothly insert the material.

In addition, according to the exemplary embodiments of the present invention, by preventing debris from being caught in the juice-extracting drum in the juice-extracting process through the first rib step and the inclined portion formed in the first slit, the problem of debris hindering the flow of the extracted juice may be prevented and thereby the juice-extracting efficiency may be improved.

In addition, according to the exemplary embodiments of the present invention, it is possible to prevent deformation of the juice-extracting drum in the juice-extracting process by forming the juice-extracting drum from a rigid material. Accordingly, it is possible to prevent the slit from being widened, and to maintain a constant interval between slits from which juice is discharged.

In addition, according to exemplary embodiments of the present invention, by combining two modules through coupling of a coupling protrusion and a coupling groove and coupling of a key protrusion and a key groove, a combined position of the two modules may be accurately fixed, and relative rotation and tilting between the two modules in the juice-extracting process may be prevented.

In addition, since the screw rotates at a low speed and squeezes and crushes the material to form juice, instead of the crushing method using a blade rotating at a high speed, there is also a merit that the material's unique taste and nutrition may be preserved.

In addition, since the housing and the screw of the juice-extractor are vertically assembled to the upper side of the driver, the material naturally descends by gravity and rotation of the screw, so the juice-extracting speed is fast and there is no juice accumulation phenomenon, thereby also providing a merit that any kind of vegetables or fruits may be juice-extracted.

Other effects that may be obtained or are predicted by exemplary embodiments will be explicitly or implicitly described in a detailed description of the present invention.

That is, various effects that are predicted according to exemplary embodiments will be described in the following detailed description.

BRIEF DESCRIPTION OF THE DRAWINGS

The drawings are intended to be used as references for describing the exemplary embodiments of the present invention, and the accompanying drawings should not be construed as limiting the technical spirit of the present invention.

DETAILED DESCRIPTION OF THE EMBODIMENTS

Figure 1:
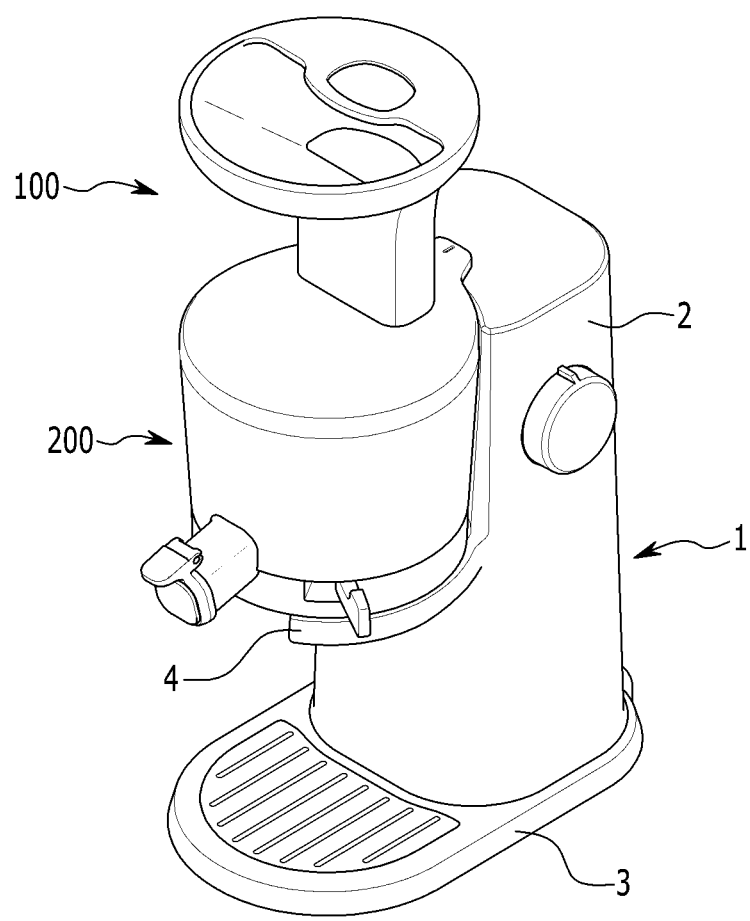
FIG. 1 and FIG. 2 are perspective views of a juice extractor applied with a juice-extracting drum according to an exemplary embodiment of the present invention.

Hereinafter, exemplary embodiments of the present invention with reference to accompanying drawings. This specification is intended to describe the present invention in detail such that a person skilled in the art may easily implement the present invention, and it does not mean that the technical ideas and categories of the present invention are limited to the exemplary embodiments or descriptions disclosed in this specification.

In addition, since each component shown in drawings are illustrated for better understanding and ease of description, the present invention is not necessarily limited to that shown in the drawings, and a size or a shape of a constituent element shown in the drawings may be may be exaggerated for clarity of description and convenience. Therefore, terms specifically defined in consideration of the composition and operation of the present invention may vary depending on the user or operator's intention or convention, and the definition of such terms should be made based on the contents throughout this specification.

In this specification, unless otherwise specified, "upper side", "upper portion", "upper end", or similar terms refer to a side into which a material is inserted, or a portion or an end close thereto. In addition, "lower side", "lower portion", "lower end", or similar terms refer to a side opposite to the side into which a material is inserted, or a portion or an end close thereto Hereinafter, a juice-extracting drum according to an exemplary embodiment of the present invention is described in detail with reference to the drawings.

Figure 2:
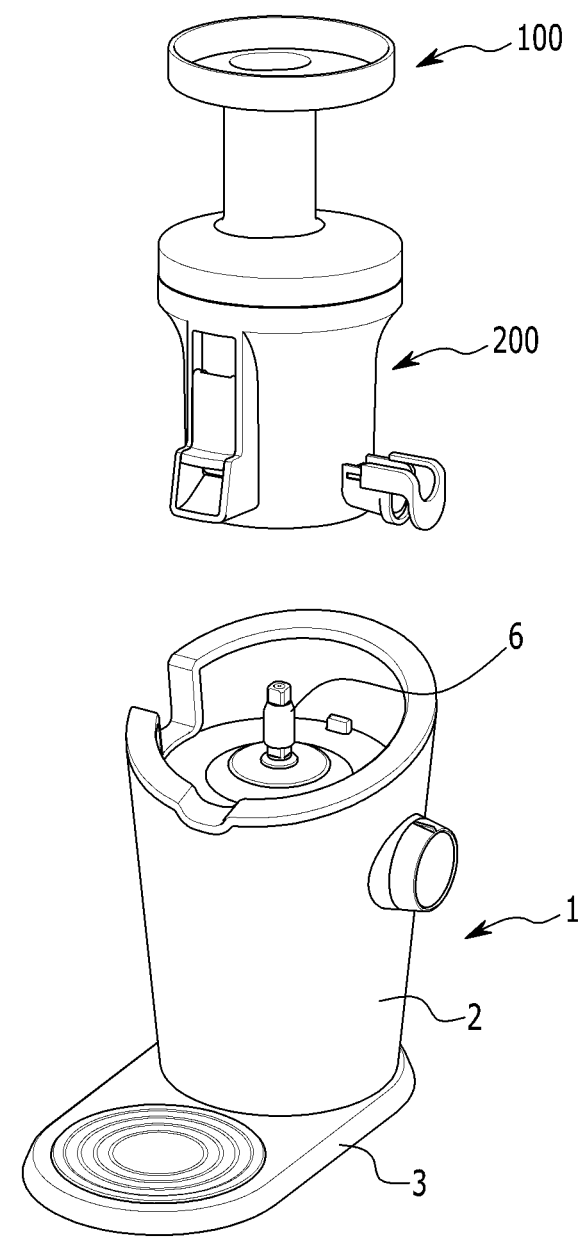

FIG. 1 and FIG. 2 is a perspective view of a juice extractor according to an exemplary embodiment of the present invention.

Figure 3:
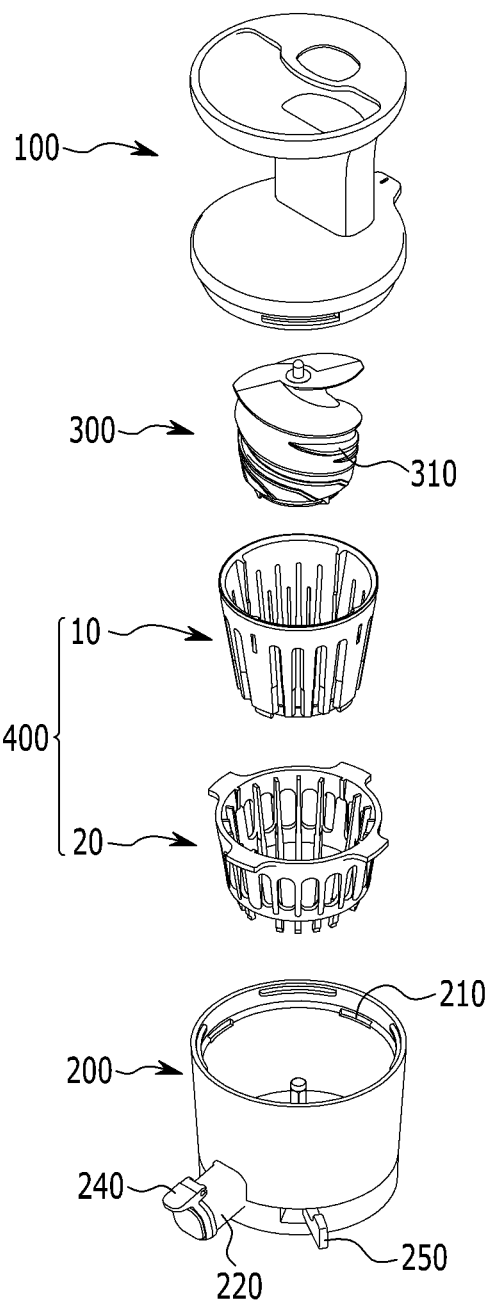
FIG. 3 to FIG. 6 are exploded perspective view of a juice extractor according to an exemplary embodiment of the present invention.

FIG. 1 is an exemplary embodiment of a laterally driven juice extractor applicable with a juice-extracting drum according to the present invention, and the juice extractor may include a main body 1, a hopper 100, a drum housing 200, and a juice-extracting drum 400 (refer to FIG. 3).

The main body 1 may include an upper support 2, a lower support 3, and a speed reducer container 4. Inside the main body 1, a drive motor that generates driving torque and a speed reducer (not shown) that transmits the driving torque to a drive shaft 6 may be disposed.

The upper support 2 may be formed in a shape corresponding to a part of the exterior circumference of the drum housing 200, to support a lateral portion of the drum housing 200.

The lower support 3 extends from a lower portion of the main body 1 toward an underneath of the drum housing 200, and may be formed in a plate shape. On the lower support 3, a debris cup (not shown) that may hold the debris may be disposed.

The speed reducer container 4 extends in the transverse direction from a center of the main body 1 toward the drum housing 200, and the speed reducer may be disposed therein. The speed reducer container 4 may be formed in a shape corresponding to a bottom surface of the drum housing 200 such that the drum housing 200 may be seated thereon.

Subsequently, as shown in FIG. 2, a upward driven juice extractor according to another exemplary embodiment of the present invention is generally the same as an exemplary embodiment of a juice extractor shown in FIG. 1 described above, while showing difference in that the juice-extracting drum 400 is seated on the upper portion of main body 1 such that the drive shaft 6 of drive motor 5 may transmit power to a screw 300 (refer to FIG. 3) on the same axis.

The main body 1 may include an upper support 2 and a lower support 3. Inside the main body 1, a drive motor that generates driving torque and a speed reducer (not shown) that transmits the driving torque to a drive shaft 6 may be disposed.

The upper support 2 may be formed in a shape corresponding to a part of the bottom surface of the drum housing 200, to accommodate the drum housing 200 on an upper portion and to connect the drive shaft 6 to the screw 300. Furthermore, the drive shaft 6 is configured to be connected to a shaft of the screw 300 through a hole through the center of the drum housing 200.

The lower support 3 extends from the lower portion of main body 1 toward a juice outlet, and may be formed in a plate shape (FIG. 1C does not illustrate that the direction of lower support 3 extends exactly in the direction toward the juice outlet). On the lower support 3, a juice cup (not shown) that may hold juice may be disposed.

The drum housing 200 of the juice extractor of the present invention shown in FIG. 1 and FIG. 2 may accommodate the juice-extracting drum 400 accommodating the screw 300. The juice-extracting drum 400 accommodates the screw 300 inside, and drive motor (not shown) of main body 1 transmits power to the screw 300 through a drive shaft (not shown). The drive motor includes the speed reducer (not shown), and the speed reducer reduces the rotation speed (approximately 1,800 rpm) of the drive motor, such that the screw 300 rotates at a low speed (approximately 80 rpm or less). This enables juice-extracting without destroying nutrients. A juice extractor having such a structure is usually called a vertical low-speed juice extractor.

Figure 4:
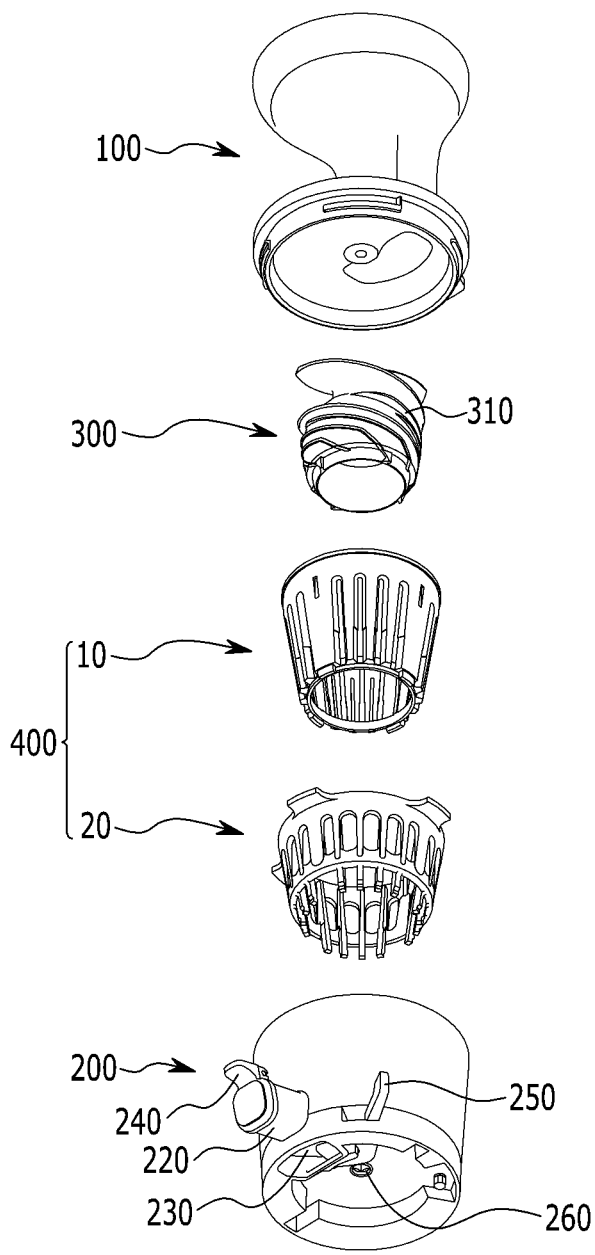

FIG. 3 and FIG. 4 are exploded perspective views of a juice extractor according to an exemplary embodiment shown in FIGS. 1 and 2 of the present invention. The main body is omitted to avoid duplicate description. As shown in FIG. 3 and FIG. 4, the hopper 100 is capable of inserting a juice-extracting target (e.g., vegetables, grains, fruits, etc.) into the inside, and guides the inserted juice-extracting target to the juice-extracting drum 400.

The drum housing 200 is formed in a cylinder shape with an upper portion open, and the screw 300 and the juice-extracting drum 400 may be disposed therein.

A juice outlet 220 and a debris outlet 230 are formed in a lower portion of the drum housing 200. The juice outlet 220 may protrude in a pipe shape on the lower side of the drum housing 200 such that juice may be easily discharged. As can be seen in FIG. 1, the debris outlet 230 may be formed on a lower surface of the drum housing 200 such that the debris may be discharged vertically downward from the drum housing 200, and as may be seen in FIG. 2, the debris outlet 230 may protrude in a pipe shape on the drum housing 100. The juice outlet 220 may be opened or closed by a juice shutoff mechanism 240, and the debris outlet 230 may be opened or closed by a debris shutoff mechanism 250.

A drum hole 260 is formed in a lower center of the drum housing 200. The drive shaft is inserted into the drum hole 260 and connected to the screw 300 to transmit power to the screw 300. An interior circumference of the drum hole 260 may have a shape corresponding to the shape of the drive shaft such that the drive shaft may be inserted.

The screw 300 is capable of rotational movement by receiving torque from the drive shaft, and squeezes or crushes the juice-extracting target. At an exterior circumference of the screw 300, at least one first spiral protrusion 310 is formed to contact with the juice-extracting drum 400. The juice-extracting target is transferred to the lower portion by the first spiral protrusion 310, and the juice-extracting target is squeeze by a narrow gap between the screw 300 and the juice-extracting drum 400. For this purpose, the spacing between neighboring first spiral protrusions 310 formed in an upper portion of the screw 300 may be greater than the spacing between neighboring first spiral protrusions 310 formed in a lower portion of the screw 300.

Figure 5:
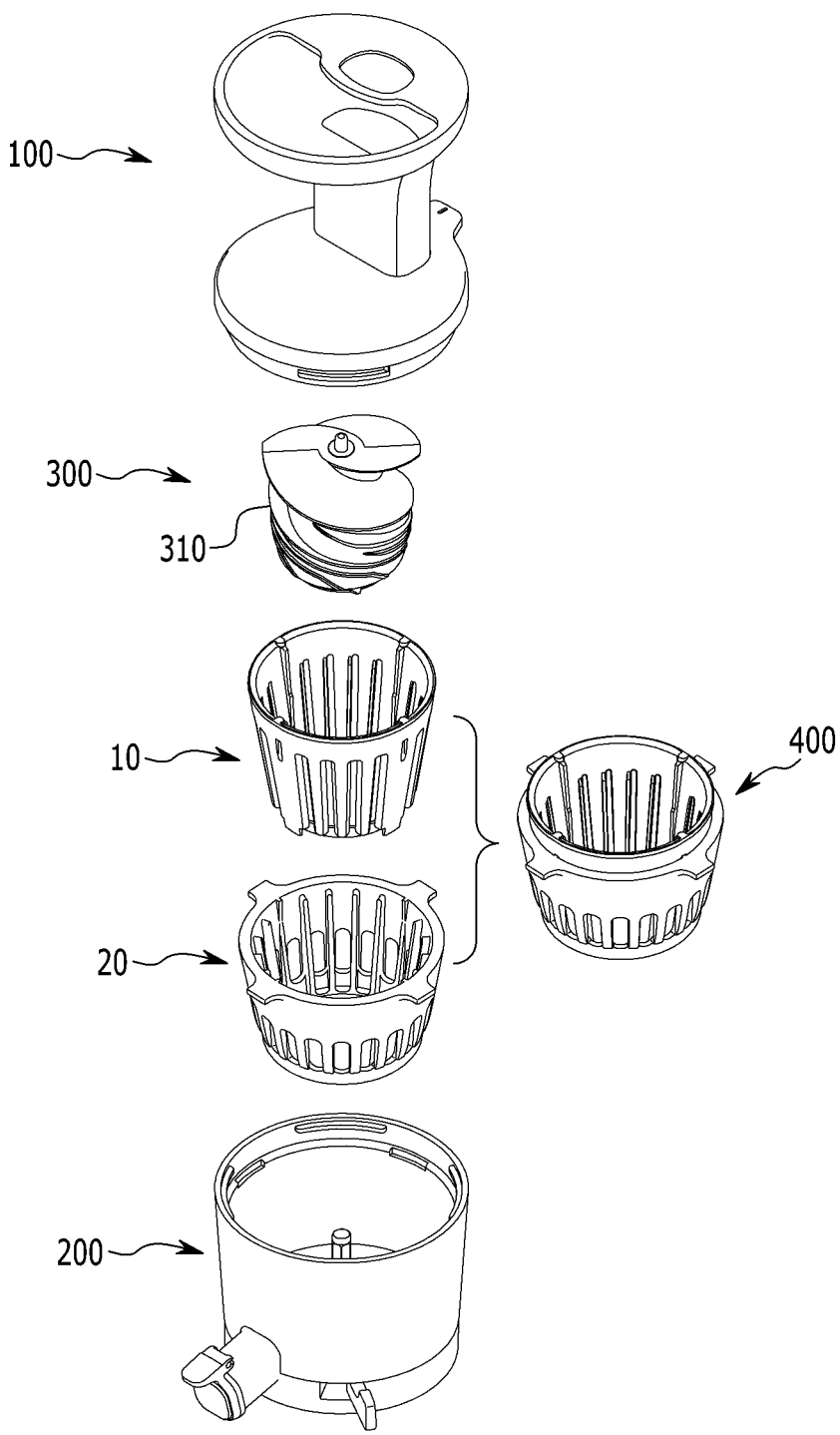
Figure 6:
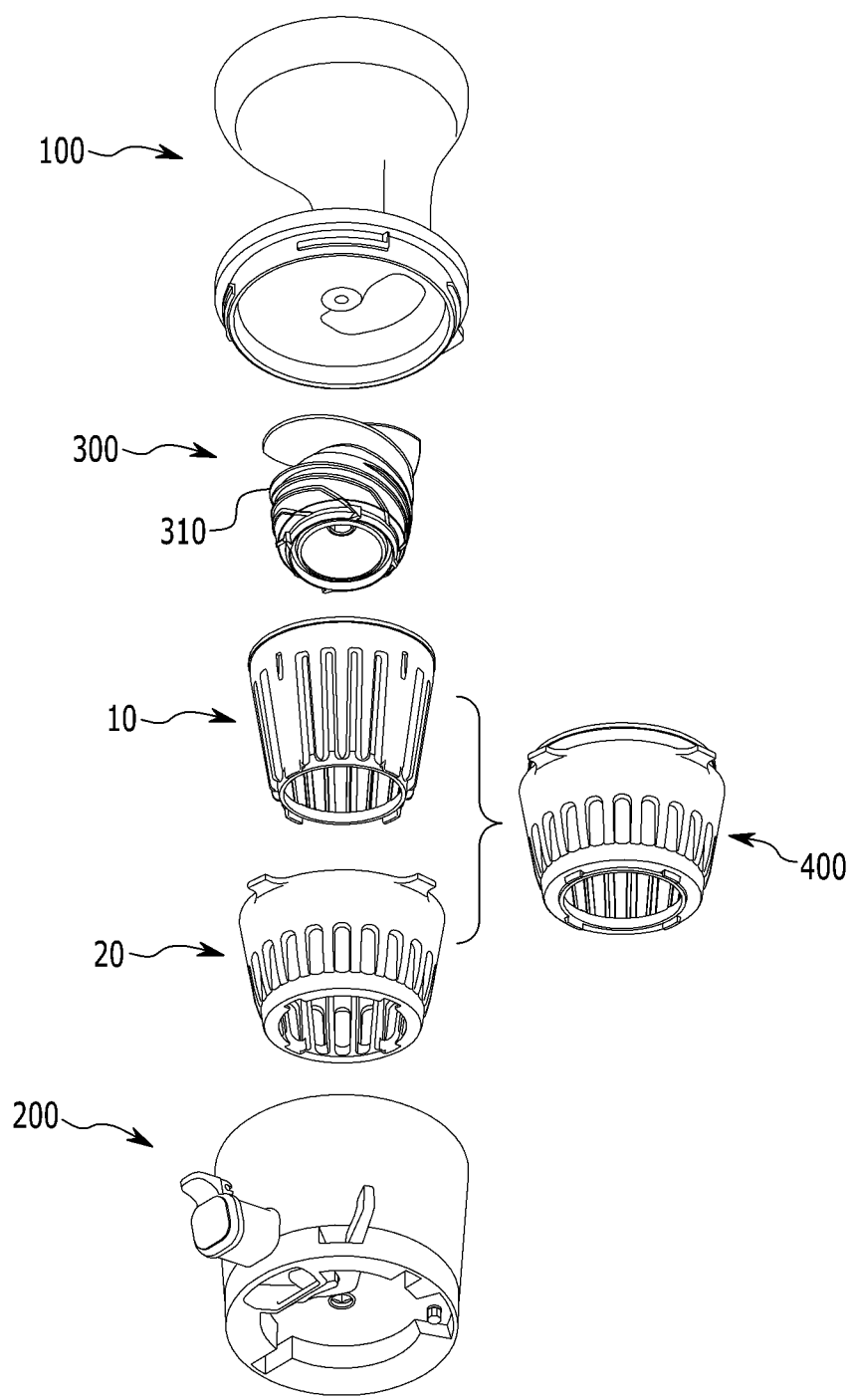

FIG. 5 and FIG. 6 are exploded perspective views of a juice extractor according to another exemplary embodiment shown in FIG. 3 and FIG. 4 of the present invention. A juice extractor according to another exemplary embodiment of the present invention is generally the same as the above-described exemplary embodiment of a juice extractor shown in FIG. 3 and FIG. 4, while having difference in the shape of the juice-extracting drum 400. In addition, the juice-extracting drum 400 is seated on the upper portion of main body 1, such that the drive shaft 6 of drive motor 5 may transmit power to the screw 300 on the same axis, and a brush is not disposed.

First, before a detailed description of an exemplary embodiment of each juice-extracting drum, a common structure of a juice-extracting drum of the present invention for achieving the purpose of the present invention will be briefly described.

Figure 7:
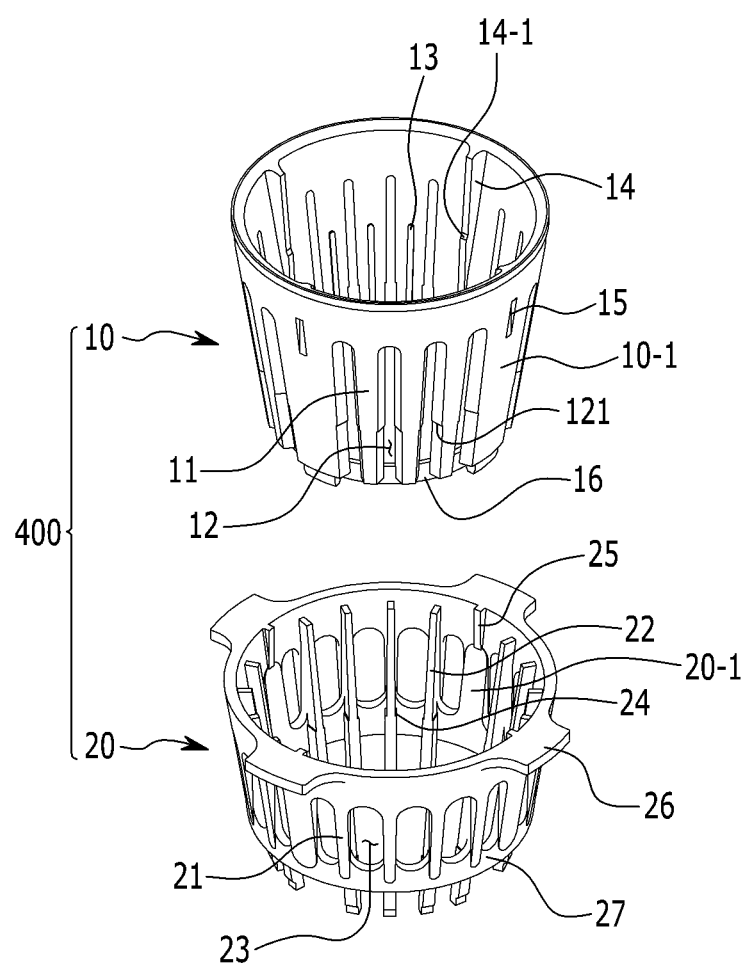
FIG. 7 and FIG. 8 are exploded perspective views of a juice-extracting drum according to a first exemplary embodiment of the present invention.
Figure 8:
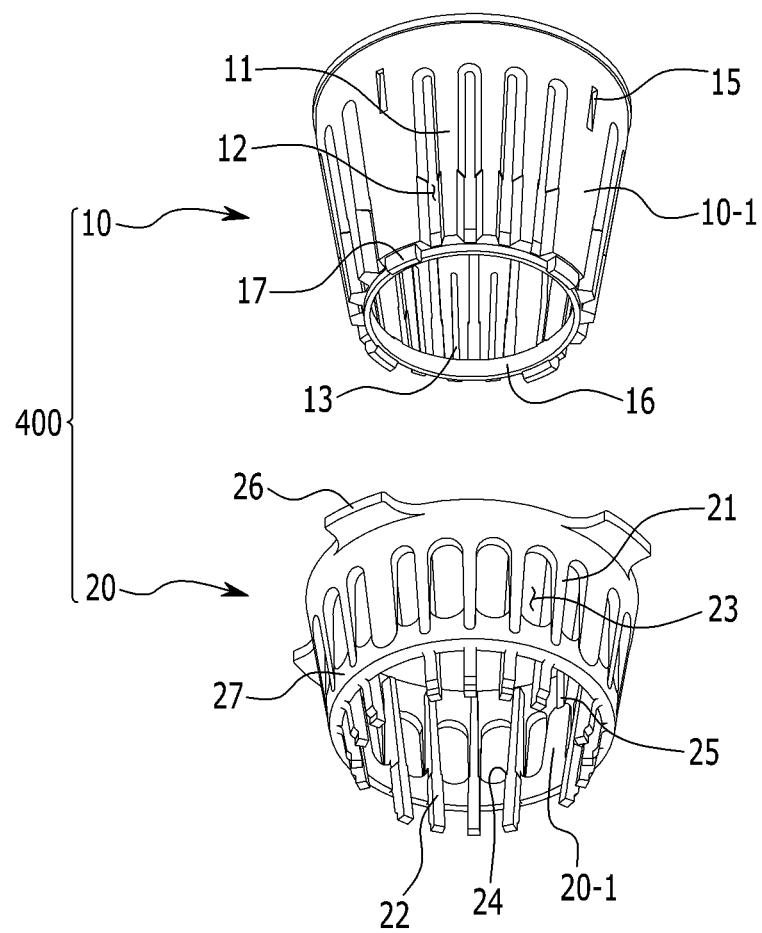
Figure 9:
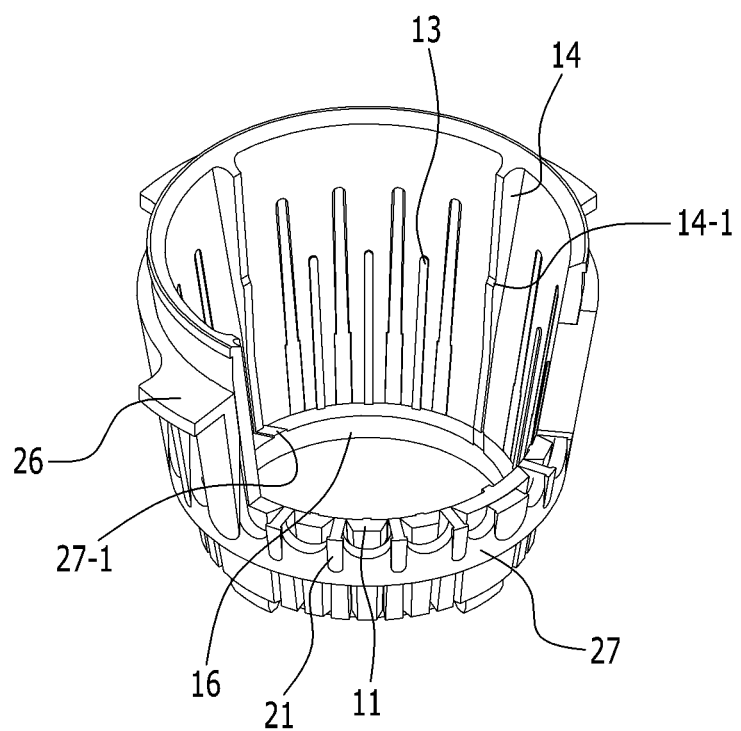
FIG. 9 and FIG. 10 is a perspective view of a juice-extracting drum according to a first exemplary embodiment of the present invention.
Figure 10:
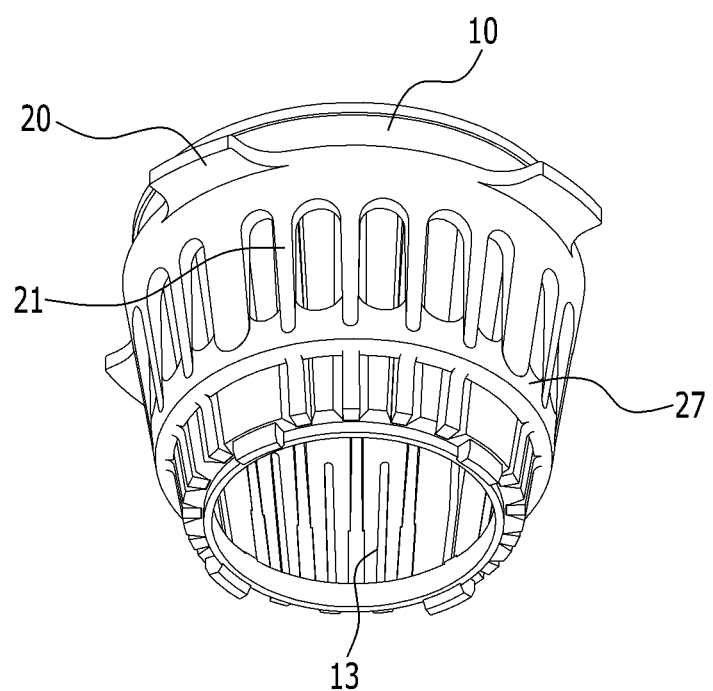

FIG. 7 and FIG. 8 are exploded perspective views of a juice-extracting drum according to a first exemplary embodiment of the present invention, and FIG. 9 and FIG. 10 is a perspective view of a juice-extracting drum according to a first exemplary embodiment of the present invention. In addition, FIG. 11 to FIG. 14 are exemplary variations of a juice-extracting drum of the present invention, and FIG. 15 is an exemplary embodiment of an inner module of a juice-extracting drum of the present invention.

As can be seen in FIG. 7 to FIG. 8, the juice-extracting drum 400 is a hollow cylinder or truncated circular cone shape, and may squeeze or crush the juice-extracting target by an interaction with the screw 300.

The juice-extracting drum 400 of the present invention may include cylindrical two modules of an inner module 10 and an outer module 20 that are detachably assembled, and when two modules are combined, a narrow gap is formed lengthily such that juice extracted by the screw comes out therethrough.

The inner module 10 is formed as a hollow cylindrical shape with an upper portion open such that the screw 300 may be accommodated therein, and at least one slit 12 forming penetration over the upper portion and the lower portion is formed on a circumferential surface. If necessary, a lower part may also be formed in an open cylindrical shape. The slit 12 is formed as a penetration hole that includes both lateral sides and upper and lower surfaces such that the slit width is fixed, and the lateral sides and upper and lower surfaces may be continuously formed without distinction from each other.

The outer module 20 is formed in an open cylindrical shape having the upper portion open such that the inner module 10 is surrounded and detachably coupled, and is formed with a rib 22 that is inserted into the slit 12 of the inner module 10 when combined with the inner module 10. If necessary, the lower portion may also be formed in an open cylindrical shape. The rib 22 may be formed as a comb tooth protrusion or a protrusion including both lateral sides, a protrusion surface, an upper surface, and a lower surface, the protrusion surface, the upper surface, and the lower surface may be continuously formed without distinction from each other.

The rib 22 has a position and a shape corresponding to the slit 12 of the inner module 10 such that a predetermined fixed gap may be formed narrowly and lengthily with the slit 12 of the inner module 10 when the inner module 10 and the outer module 20 are coupled. When extracting juice, the juice comes out through the gap. In further detail, the rib 22 has a position and a shape corresponding to the slit 12 of the inner module to form a predetermined fixed fine gap narrowly and lengthily between the both lateral sides of the inner module slit 12 and the both lateral sides of the rib 22 of outer module 20 when the inner module 10 and the outer module 20 are coupled, When juice is extracted from the juice-extracting target by an interaction with the screw 300, the juice comes out through the gap formed at a side of the inner module 10, and the debris remains inside of the inner module 10.

Although the width of the gaps is determined as needed in consideration of juice-extracting efficiencies of various materials and specific design constraints of module, the width of the gaps may be sufficient if debris may be filtered during the process of squeezing the juice.

In addition, since juice-extracting is possible when the gap is a penetration hole elongated to cross the spiral of the screw 300 when the screw 300 is accommodated in the juice-extracting drum 400, it is not limited to any hole or any shape, the shape of the slit 12 is not limited to any shape, whether it is a hole in a bar shape or a hole in an egg shape.

In addition, in order that the inner module 10 may be smoothly coupled with or detachable from the upper side of the outer module 20, the upper portion of the outer module 20 is open, and the inner module 10 and the outer module 20 have a generally truncated conical shape that narrows down and the exterior diameter of the inner module 10 is formed smaller than the interior diameter of the outer module 20 such that the rib 22 of the outer module 20 is inserted into the slit 12 of the inner module 10 when the inner module 10 is accommodated in the outer module 20.

Although the juice-extracting efficiency is improved compared to a conventional netted drum, the two modules may be easily separated providing easier cleaning, the problem of clogging the netted holes in a conventional netted drum is basically solved, the brush that had to be equipped in the conventional vertical juice extractor becomes unnecessary, and there is no need for various parts to drive the brush.

Figure 17:
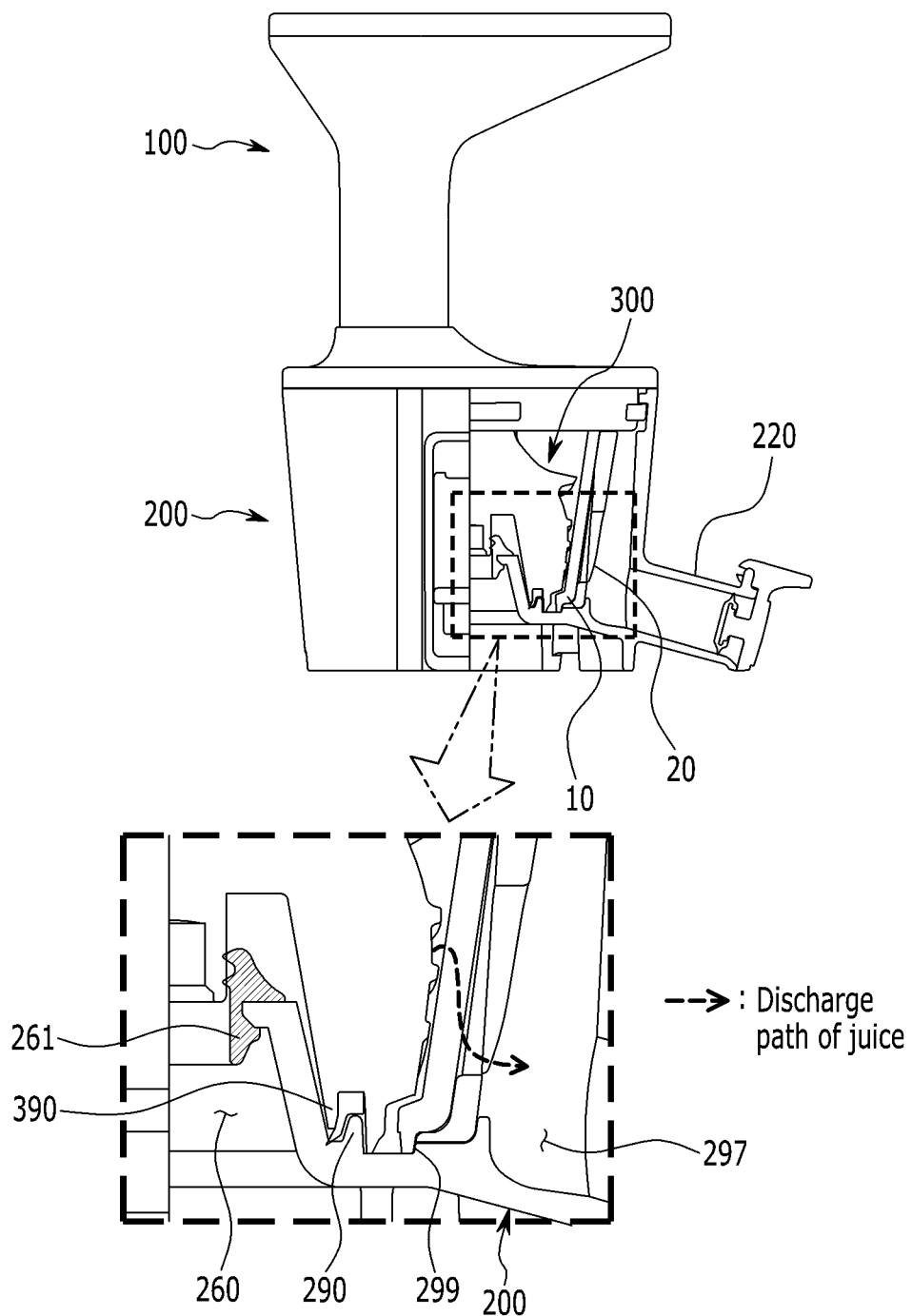

FIG. 15 illustrates inner module 10 of a juice-extracting drum according to an exemplary embodiment of the present invention. As can be seen in FIG. 15, on an interior circumference of an inner module 10 of a juice-extracting drum of the present invention composed of two modules according to an exemplary embodiment of the present invention, rib steps 13 and 14 protruding in a radially interior direction may be formed with a predetermined spacing. The rib steps 13 and 14 are formed along a vertical direction on the interior circumference of the inner module 10. Since the outer module 20 does not directly interact with the screw 300, the rib steps 13 and 14, which help crush and squeeze through the interaction with the screw 300 while descending the juice-extracting target, are formed only on the inner module 10 and not on an interior surface of the outer module 20. As can be seen in FIG. 17, in an exemplary embodiment of the present invention, the screw 300 is fully accommodated in the inner module 10 and a body of the screw 300 interacts with the inner module 10 as a whole. Therefore, the rib steps 13 and 14 are formed over the upper portion and the lower portion of the inner module 10 that interact with the screw.

The rib step may be divided into long and short ones, and may be divided into a first rib step 13 that is relatively short and has a lower protrusion height and a second rib step 14 that is relatively long and has higher protrusion height. As the material is effectively moved from the upper portion to the lower portion of the inner module 10 by the screw and the second rib step 14, the compressive force is gradually increased. The juice generated by the squeeze of such compressive force is discharged while being filtered through the gap formed as rib 22 of the second module 20 is inserted into the slit 12 of the inner module 10, and therefore, effective juice-extracting is achieved. At this time, the material transferred to the lower portion while being squeeze is more finely crushed by a plurality of first rib steps 13 formed in lower portions of the second rib steps 14. At this time, the material is strongly pressed by the transporting compressive force applied to the material, juice is squeezed and discharged into the gap to increase the juice-extracting efficiency.

First, the second rib step 14 protruded in the radial direction toward the screw may be formed vertically along the length direction in the interior circumference of the inner module 10. Without the second rib step 14, it may cause a problem that, when the screw is rotated, a material such as vegetables cannot be transported smoothly downward along the screw spiral, and may stop inside the juice-extracting drum. With the second rib step 14, when the screw is rotated, the material is smoothly transferred downward along the screw spiral to be squeezed and crushed, and the second rib step 14 may reinforce the strength of the inner module 10.

The protrusion height of the second rib step 14 may be configured to have a same height from the upper portion to the lower portion, or may be configured to gradually decrease toward the lower portion. On the exterior circumference of the inner module 10, the slit 12 is not formed on the surface 10-1 where the second rib step 14 is formed, so the rigidity of the inner module 10 is reinforced.

In addition, the second rib step 14 is inclined downward from the upper portion to the lower portion, and a stepped portion 14-1 protruded to be stepped toward the screw may be formed in a middle portion. The stepped portion 14-1 of the second rib step 14 may be variously modified in its position, number, or protruded height depending on the shape of the screw and the design constraints of the spiral.

In addition, the second rib step 14 may gradually decrease in height toward the lower portion, and the second rib step 14 may not be formed in the lower portion of the inner module 10.

Figure 11:
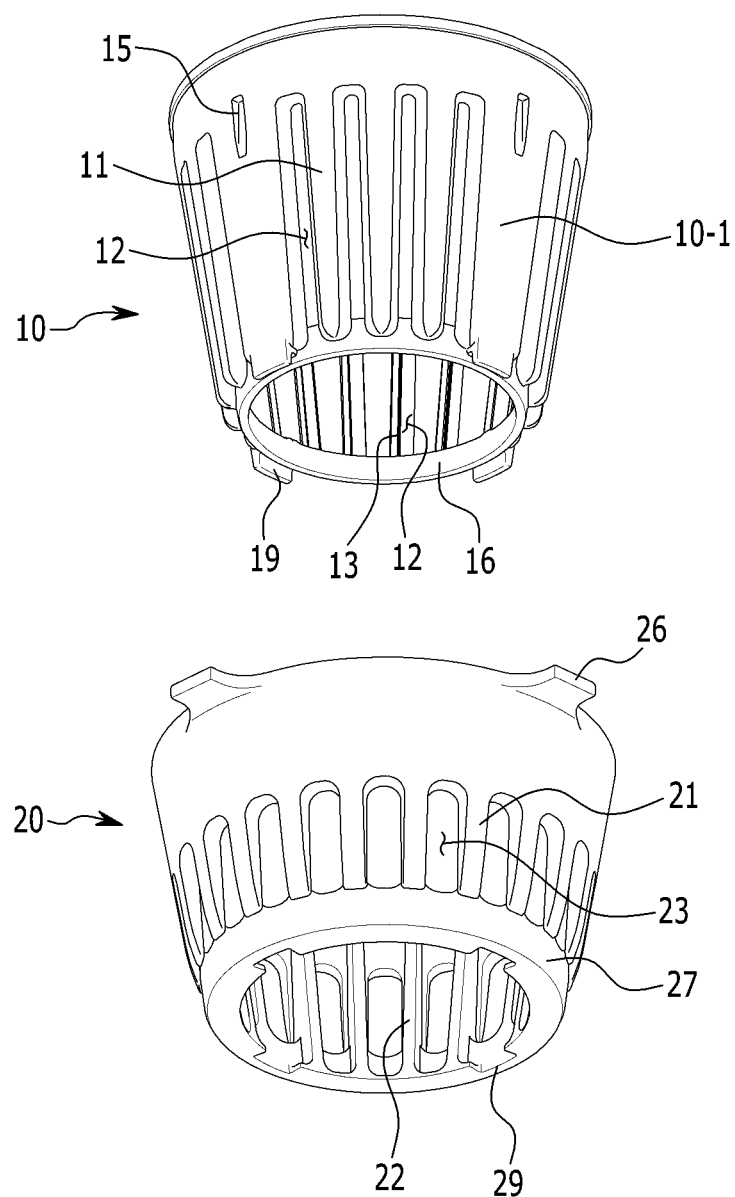
FIG. 11 to FIG. 14 are an exemplary variation of a juice-extracting drum according to an exemplary embodiment of the present invention.
Figure 12:
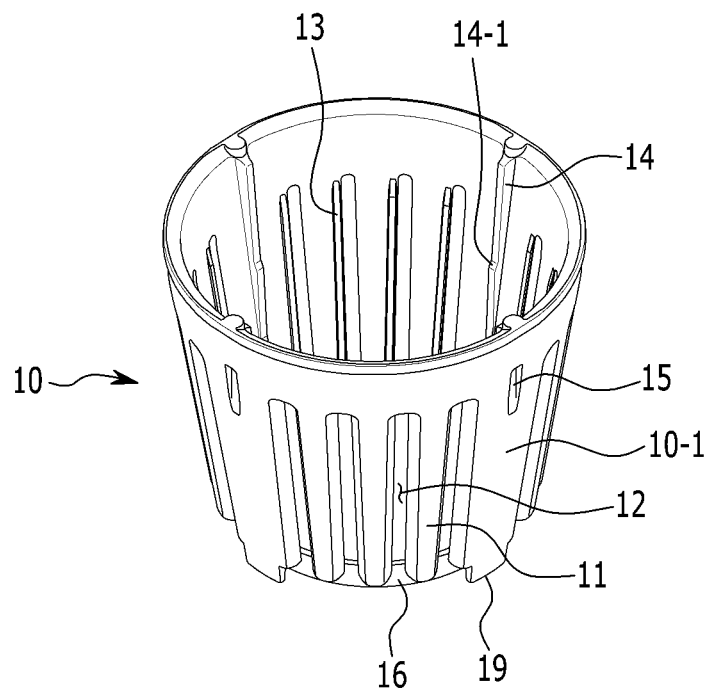
Figure 12:
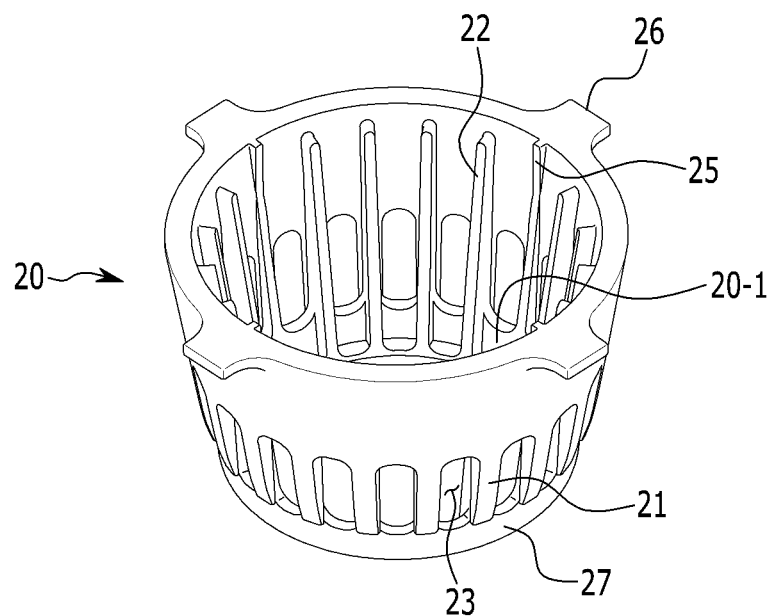

In addition, as may be seen in FIG. 7 and FIG. 8 and in FIG. 11 and FIG. 12, a guiding surface 20-1 that is not formed with the rib 22 is formed in outer module 20 correspondingly to an exterior surface 10-1 of the inner module 10 that is not formed with the slit 12. Consequently, when the inner module 10 and the outer module 20 are coupled, the inner module 10 is guided to the outer module 20, and a function of fixing a coupling position may also be performed, thereby fixing the gap without a movement.

In addition, the lower end of the inner module 10 may be fully open, or it may be that the center is open and a cyclic flange portion 16 extending inward is formed. When the lower end of the inner module 10 is fully open, the debris is discharged directly downward, but when the flange portion 16 is formed at the lower end of the inner module 10, the effect of increasing the juice-extracting efficiency by stagnation of the debris may be expected. In this case, a spiral guide step 27-1 directed toward the central portion of the inner module 10 on the upper surface of the flange portion 16 may be elongated from the second rib step 14 such that the debris may be caught to accurately guided to be discharged.

Second, the first rib step 13 is protruded in the radial direction toward the screw and vertically formed along the length direction on the interior circumference of the inner module 10, and protruded in the form of several spaced apart from each other along the interior circumference of the inner module 10. The first rib step 13 performs secondarily crushing the material such as vegetables finely and uniformly, while being transferred to the lower portion while being juice-extracted by the rotation of the screw. Therefore, in general, the protrusion height of the first rib step 13 is lower than the protrusion height of the second rib step 14, and the length of the first rib step 13 in up-and-down direction is shorter than the length of the second rib step 14. is shorter than the length of the second rib step 14.

In addition, the length of the first rib step 13 may be equal to or less than the length of the slit 12 of the inner module 10. When viewed from the upper end of the inner module 10, the first rib step 13 may be formed starting from a lower side than the second rib step 14 and to the lower end of the inner module 10.

Furthermore, the first rib step 13 may further form a step portion in the middle. The step portion may prevent stagnation of the juice-extracting material.

Figure 13:
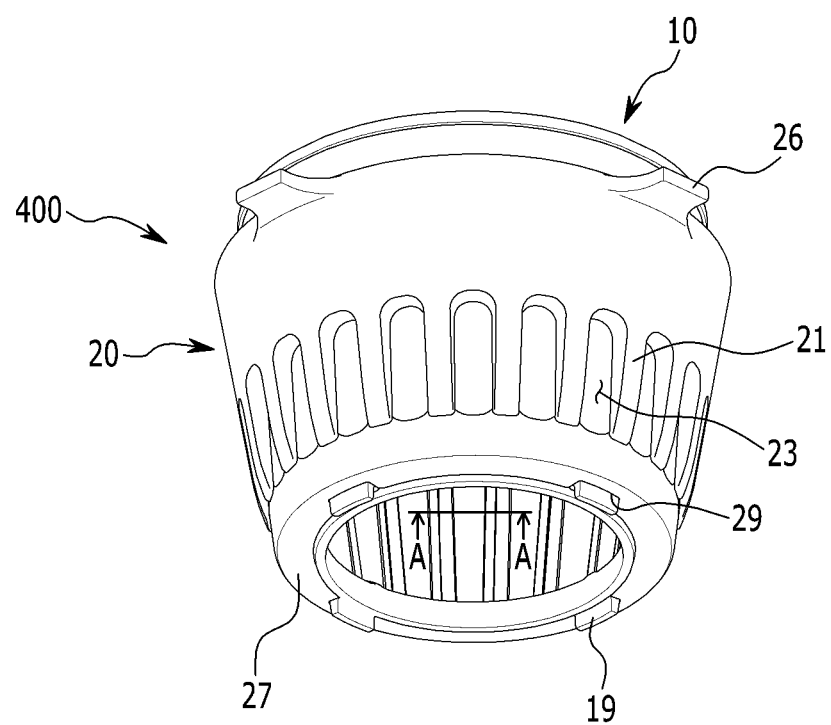
Figure 14:
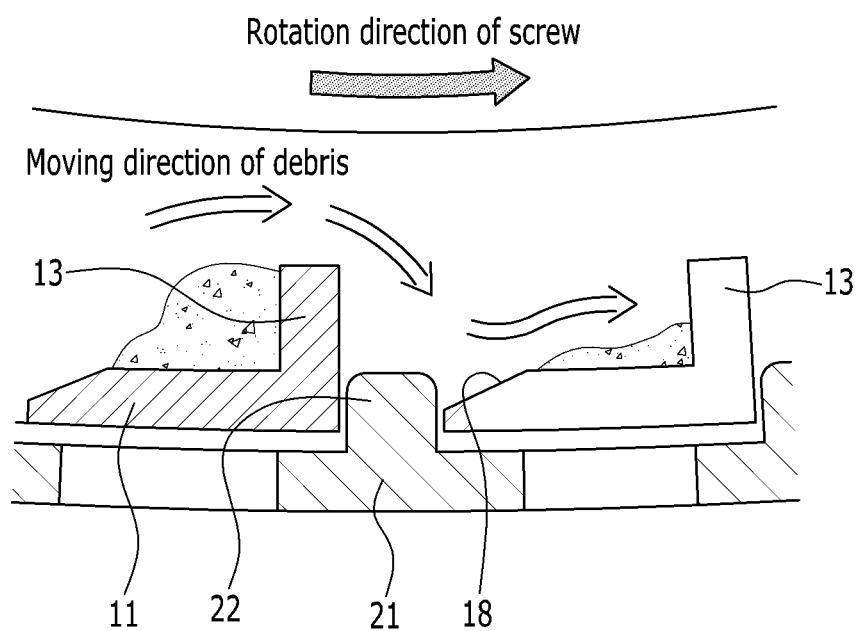
Figure 15:
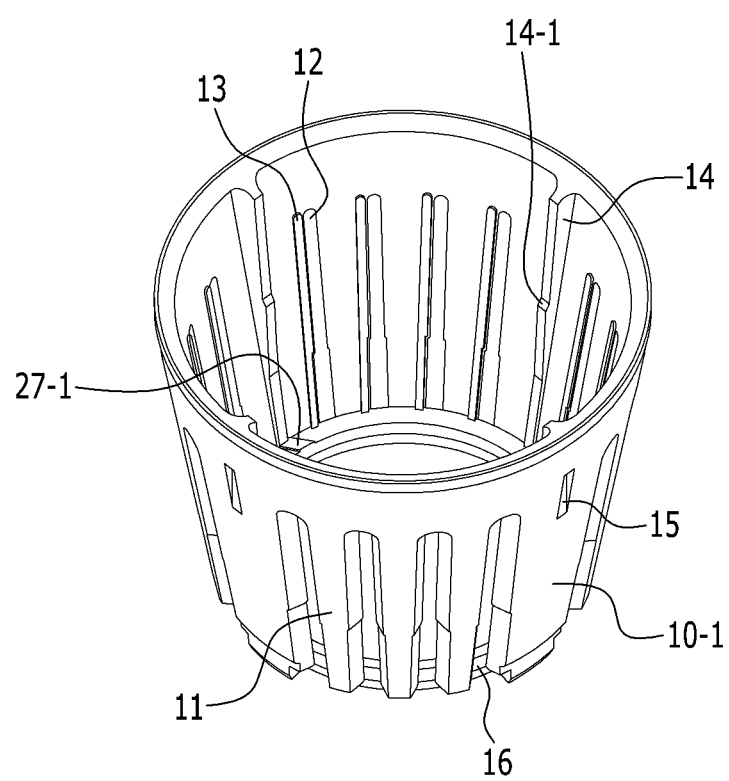
FIG. 15 is an exemplary embodiment of an inner module of a juice-extracting drum according to an exemplary embodiment of the present invention.

In addition, as may be seen in FIG. 12 to FIG. 14, the first rib step 13 may be formed close to an upstream side edge of the slit 12 in the screw rotating direction. As the first rib step 13 is formed closer to the edge of the slit 12 in the screw rotating direction, it acts as a speed bump and the squeeze force of the gap while the material is transferred decreases, such that the phenomenon that the debris comes with the juice is reduced.

In addition, an inclined portion 18 may be formed by cutting off a downstream side edge in the screw rotating direction of the slit 12 of the inner module 10. When the inclined portion 18 is formed, the debris that has crossed the first rib step 13 moves smoothly, and the phenomenon of being carried to the downstream side gap is reduced.

In addition, the width in the circumferential direction of the gap formed between the slit 12 of the inner module 10 and the rib 22 of the outer module 20 may be formed wider toward the outside in the radial direction. That is, when viewed in the direction in which the juice is ejected, the downstream side gap width is formed wider than the upstream side gap width, such that the flow of the extracted juice may be smoothed. For this purpose, a gap between both lateral sides of the slit 12 of the inner module 10 may become wider toward the radially external direction, and the width of the protrusion surface of the rib 22 of the outer module 20 may become wider toward the radially internal direction.

In addition, the width of the slit 12 and rib 22 may be relatively adjusted, such that the lower-side gap of the juice-extracting drum from which juice is filtered may be formed narrower than the upper portion-side gap. By such a configuration, it is possible to better filter the grains of the material that is getting smaller by the compressive force that increases toward the lower portion, and the juice overflowed by the lower portion side debris may be discharged into the upper portion-side gap, thereby improving juice-extracting efficiency. For this purpose, the gap of the slit 12 of the inner module 10 may be formed wider toward the lower portion, or the rib 22 of the outer module 20 may be formed wider toward the lower portion. In addition, preferably, a step portion 121 may be formed in the slit 12 of the inner module 10, and the slit width of the upper portion side may be smaller than the slit width of the lower side, or alternatively, a step portion 24 may be formed in the rib 22 of the outer module 20, and the width of the lower portion side rib 22 may be formed wider than the width of the upper portion side width, with a reference of the step portion 24.

Figure 18:
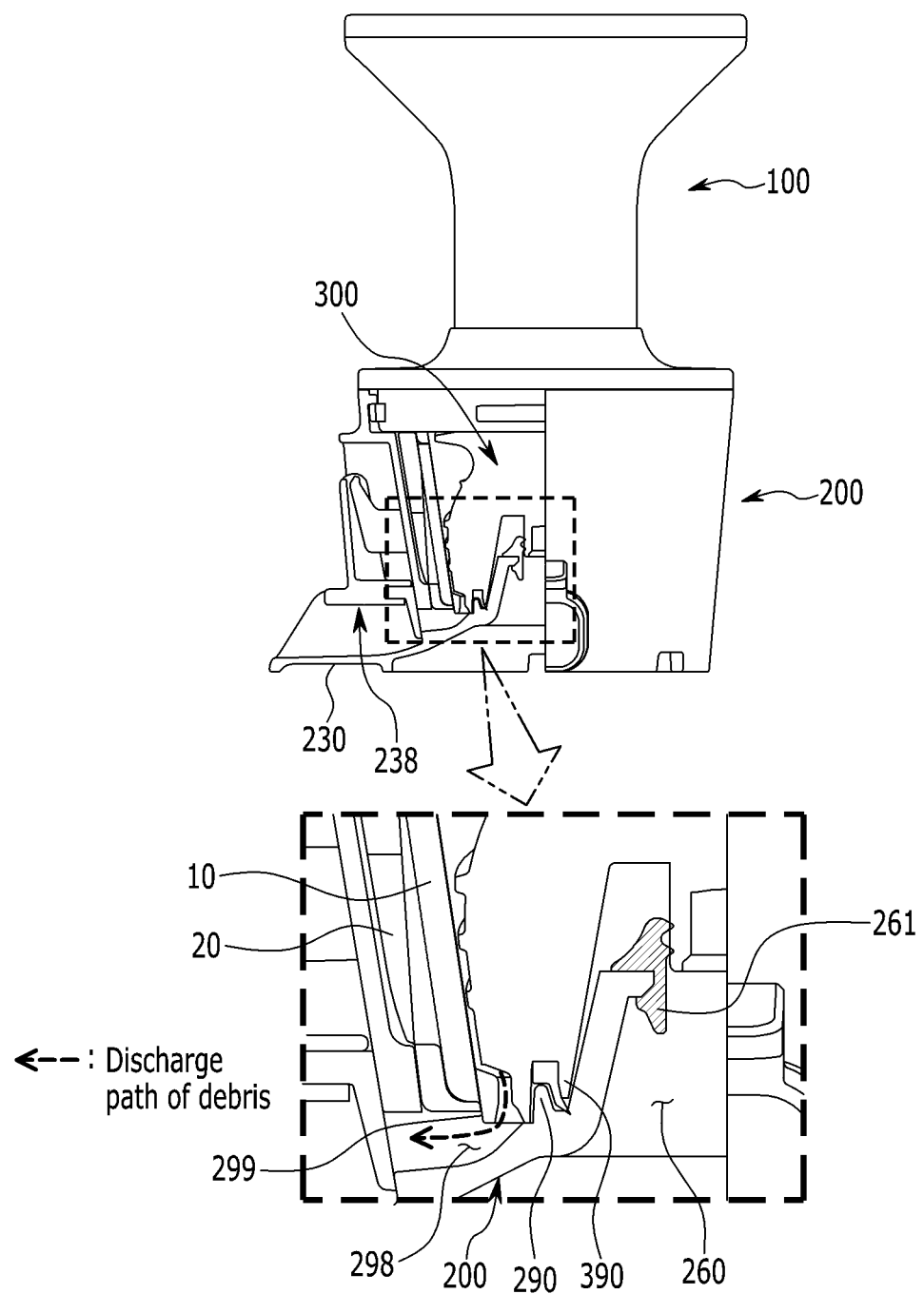

In addition, as can be seen in FIG. 17 to FIG. 18, by relatively adjusting the exterior diameter of the inner module 10 and the interior diameter of the outer module 20, the space between the exterior circumference of the inner module 10 and the interior circumference of the outer module 20 may be gradually widened toward the lower portion. The juice discharged through the gap formed between the slit 12 and rib 22 is wider toward the lower side, and thereby may be smoothly discharged through a juice outlet 220.

Hereinafter, some configuration that is not described above is described in further detail. As described above, a juice-extracting drum according to exemplary embodiments of the present invention includes the inner module 10 and the outer module 20, and the inner module 10 and the outer module 20 may be detachably coupled to each other.

The inner module 10 has a hollow cylindrical shape opened up and down, and includes at least one slit 12 formed lengthily. The slit 12 is formed toward the lower side at a position spaced downward by a predetermined distance from the upper end of the inner module 10. The outer module 20 has a hollow cylindrical shape, and includes at least one rib 22 that corresponds to and inserted into the slit 12 formed in the inner module 10. A predetermined gap is formed between the slit 12 of the inner module 10 and the rib 22 of the outer module 20 when outer module 20 and inner module 10 are coupled, and juice separated from debris occurs during juice-extracting of the material is discharged, through the gap, from the interior toward the exterior of the juice-extracting drum. That is, the gap between the slit 12 and rib 22 serves as netted holes of the conventional mesh structure.

Depending on the type of juice extractor to which the juice-extracting drum is applied, the juice-extracting drum may take a variety of forms, as shown in FIG. 7 to FIG. 22. For example, the length of the inner module 10 and the outer module 20 may be similar, or the length of the outer module 20 may be shorter than the length of the inner module 10.

In addition, the slit 12 is formed to correspond to the entire length of the inner module 10 (the length of the slit 12 is formed longer than a predetermined length), or the slit 12 is formed only to the lower portion of the inner module 10 (the length of the slit 12 is shorter than a predetermined length).

Furthermore, the slit 12 may be formed as an upper slit formed in the upper portion of the inner module 10 and a lower slit formed in the lower portion of the inner module 10. The upper slit 12 is positioned more outward in the radial direction than the lower slit 12. In the present invention, the slit is not formed in the outer module 20, and penetration holes formed in the outer module 20 do not act as a slit, but serve as a passage for discharging juice.

Meanwhile, the slit 12 is not limited to a square shape hole or an oval shape hole if a hole is viewed to intersect the spiral of the screw 300 when the screw 300 is accommodated in a juice-extracting drum. In addition, rib 22 is not limited to a shape if the rib 22 corresponds to and is inserted into the slit 12 to form a gap with the slit 12. Here, the term "bar" is named for convenience. In the cylindrical module, along the circumferential direction, a hole portion where the slit 12 is formed and a plate portion where slit 12 is not formed are alternately formed, and the plate portion 11 without slit 12 is called a "bar".

As can be seen in FIG. 7 to FIG. 22, the rib 22 according to exemplary embodiments of the present invention may be formed in any shape, in that the rib 22 is inserted into the slit 12 of the inner module 10, and the gap between the ribs 22 and slit 12 in the radial direction may intersect the first spiral protrusion 310.

Meanwhile, at least one of the rib steps 13 and 14 may be spaced apart along the interior circumference of the inner module 10. The rib steps 13 and 14 may be formed in the length direction of the inner module 10. Through the description above and below, it may be understood that the rib steps 13 and 14 formed in the interior circumference of the inner module 10 and the rib 22 of the outer module 20 inserted into the slit 12 of the inner module 10 perform different functions.

Without these rib steps 13 and 14, the juice-extracting target may stagnate without going down, or the squeezing force or the crushing force may be small or may not occur. In addition, since the inner module 10 may be deformed by the compressive force generated in the process of transferring and compressing the material by spiral 310 of the screw 300, the rib steps 13 and 14 may be formed to reinforce the inner module 10.

In one aspect, the rib steps 13 and 14 may include a rib step (hereinafter, called a "first rib step") 13 formed in an interior circumference of the bar 11 that is not formed with the slit 12 of the inner module 10 and having a length shorter than or similar to the length of the slit 12, and a rib step (hereinafter, called a "second rib step") 14 formed vertically or almost vertically on the interior circumference of the bar 11 that is not formed with the slit 12 and elongated longer than the length of the slit 12.

In general, the rib steps 13 and 14 serve to allow the material inserted into the juice-extracting drum 400 to move downward by being pinched in a narrow portion in contact with the screw 300. The rib steps 13 and 14 may perform the function of squeezing the material well together with the screw 300 while lowering the material. Therefore, the rib steps 13 and 14 do not necessarily have to be formed in the length direction of the juice-extracting drum 400, and may be implemented, in a shape crossing the spiral 310 of the screw 300, in an inclined shape with a predetermined slope with respect to the length direction for efficient transport and squeeze of the material.

On the other hand, the second rib step 14 is formed lengthily along the length direction on the interior circumference of bar 11, and may provide, as well as the function to guide and squeeze the material, a reinforcing function that prevents deformation of inner module 10 by the squeezing force generated while the material is transferred and squeezed by the spiral of the screw 300, and an adjusting function to adjust accommodation position of the screw 300 within the juice-extracting drum 400 and to adjust a juice-extracting space.

Figure 20:
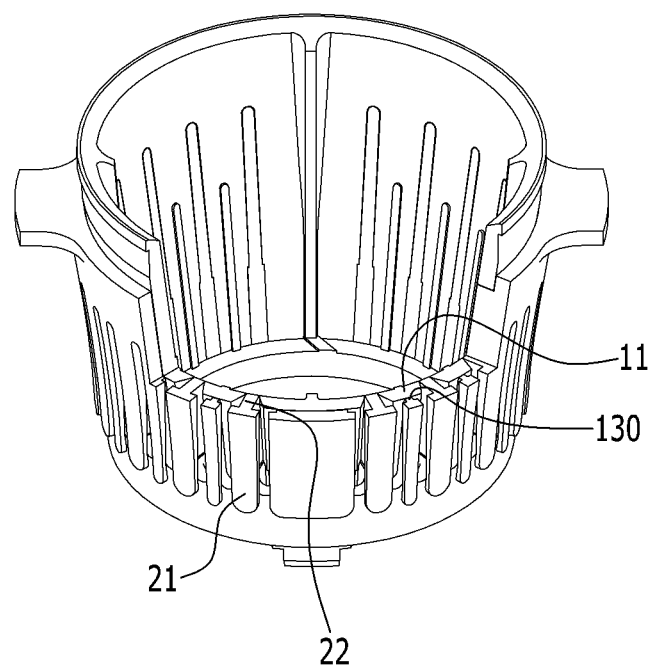
FIG. 20 is a still another exemplary variation of a juice-extracting drum of the present invention applied with the outer module of FIG. 19.

In addition, although the protrusion height of the second rib step 14 may be configured to have a same height from the upper portion to the lower portion, as can be seen in FIG. 7, FIG. 15, and FIG. 20, the protrusion height may be gradually lowered from the upper portion toward the lower portion, or at least one stepped portion 14-1 may be formed in the middle portion of the second rib 14 in the length direction.

In addition, as can be seen in FIG. 7 to FIG. 12, a plurality of bars 11 may include a bar 11 having a relatively narrow width and a bar having a relatively wide width. In addition, the first rib 13 may be formed in the interior circumference of the bar 11 having a relatively narrow width, and the second rib 14 may be formed in the interior circumference of the bar 11 having a relatively narrow width.

Furthermore, on the interior circumference of the outer module 20 contacting the exterior circumference of the relatively wide bar 11 of the inner module 10 when the inner module 10 and the outer module 20 are coupled, a means for fixing the inner module 10 and the outer module 20 may be provided, instead of forming the rib 22.

For example, as can be seen in FIG. 12, a key protrusion 25 may be formed in the interior circumference of the outer module 20, and a key groove 15 is formed in the exterior circumference of the inner module 10 such that the key protrusion 25 is inserted into the key groove 15, and thereby, coupling position of the inner module 10 and the outer module 20 may be fixed. By inserting the key protrusion 25 into the key groove 15, it is possible to limit the coupling position, relative rotation, and tilting of the inner module 10 and the outer module 20. Separately, as can be seen in FIG. 11, a coupling protrusion 19 may be formed in the exterior circumference lower end of the relatively wide bar 11 of the inner module 10, and a coupling groove 29 that may be coupled to the coupling protrusion 19 may be formed in the lower end cyclic flange 27 of the outer module 20 facing the bar 11 having a relatively wide width. By combining the coupling groove 29 and the coupling protrusion 19, the relative position of the outer module 20 with respect to the inner module 10 is determined, and accordingly, the gap size may be maintained.

In the above-described exemplary embodiment, the protrusion may be altered to a groove and the groove may be altered to a protrusion, and the means for fixing the inner module 10 and the outer module 20 is not limited to the coupling groove and coupling protrusion described above.

In one aspect, when a separation space is formed between the interior circumference that is not formed with the rib 22 in the outer module 20 and the corresponding exterior circumference of the inner module 10, a space is provided for the juice to flow down without obstruction, and therefore, juice flows between the inner module 10 and the outer module 20.

In another aspect, the separation space between the interior circumference that is not formed with the rib 22 in the outer module 20 and the exterior circumference of the inner module 10 corresponding thereto may become larger toward the lower portion, such that the extracted juice may gathered toward the lower portion.

In a still another aspect, in order to form the separation space between the interior circumference that is not formed with the rib 22 in the outer module 20 and the exterior circumference of the inner module 10 corresponding thereto, the exterior diameter of the inner module 10 may be configured to decrease gradually from the upper portion to the lower portion, or at least one step having a decreasing exterior diameter may be provided at the central position of the exterior circumference of the inner module 10 in the length direction.

In addition, as can be seen in FIG. 7 to FIG. 12, the width (distance between one slit and a neighboring slit along a circumferential direction) of the bar 11 between the slits 12 of the inner module 10 may have a shape that broadens toward the center of the radial direction. In this case, the gap formed between the slit 12 of the inner module 10 and the rib 22 of the outer module 20 of the juice-extracting drum 400 is configured to widen from the inner side to the outer side in the radial direction, to prevent a problem that the gap is block by the debris or the flow of the juice is hindered in the juice-extracting process.

In one aspect, in order to make the width of the bar 11 wider toward the center in the radial direction, the cross-section of bar 11 formed in inner module 10 may be generally composed of a semicircular shape, an oval shape, or a trapezoid shape.

Meanwhile, the material is transferred to the lower side by rotation of the screw 300 within the inner module 10 of the juice-extracting drum 400, the material is gradually compressed to have smaller grains since the gap between the screw 300 and the interior circumference of the inner module 10 gradually narrows toward the lower side, and the compressive force due to the compression of the material becomes larger and larger toward the lower portion. Therefore, the lower portion-side gap of the juice-extracting drum from which the juice is filtered may be formed narrower than the upper portion-side gap. In addition, depending on the material, discharge of juice through the lower portion-side gap may be hindered by debris generated in the juice-extracting process. Therefore, the upper portion-side gap of the juice-extracting drum may be formed relatively wide compared to the lower portion-side gap such that juice overflows through the upper portion-side gap. That is, the gap formed between the slit 12 of the inner module 10 and the rib 22 of the outer module 20 of the juice-extracting drum may be configured such that the lower portion is narrower continuously or discontinuously than the upper portion.

For this purpose, in one aspect, as can be seen in FIG. 7 to FIG. 11, the width of the slit 12 of the inner module 10 may be made wider toward the lower side, and the width of the slit 12 of the inner module 10 may be made narrower toward the upper side. In the other aspect, the width of the slit 12 of the inner module 10 is constant, and the width of the rib 22 of the outer module 20 may be formed narrower toward the upper side.

In a still another aspect, as can be seen in FIG. 7 to FIG. 11, a step is placed in the central portion of inner module 10 or outer module 20 in the length direction. Taking the step as a reference, regarding the gap formed between the slit 12 of the inner module 10 and the rib 22 of the outer module 20, the upper portion side may be wider than the lower portion side, and for this purpose, the width of the rib 22 of the outer module 20 may be made narrower toward the upper side by using the step as a reference.

Meanwhile, the juice-extracting drum 400 may be made of a high-strength material that is harmless to the human body, yet sufficiently withstands the pressure generated in the juice-extracting process and maintains a gap between the slits 12. In addition, the juice-extracting drum 400 may also be made of one thin plate of high-strength material.

In one aspect, the inner module 10 and the outer module 20 may be made integrally using Polyetherimide. The inner module 10 and the outer module 20 may be manufactured by injection.

Meanwhile, since the compressive force received by the material gradually increases toward the lower portion of the juice-extracting drum 400, deformation or damage of the inner module 10 may occur or the gap formed between the inner module 10 and the outer module 20 may be increased or deformed. Therefore, as can be seen in FIG. 7 to FIG. 11, a cyclic reinforcing ring or flange 16 may be formed to fix the slit 12 of the inner module 10. The reinforcing ring 16 may be formed at the lower end of or between the lower end and the upper end of the inner module 10 to hold the slit 12, and may be formed in the form of a cyclic flange at the lower end opening. Thereby, the slit 12 does not widen or the width does not change in the juice-extracting process, and it may also serve to seat the screw in the juice-extracting drum. In addition, as shown in FIG. 11 to FIG. 15, a cyclic flange 27 is formed at the lower end of the outer module 20 to support the inner module 10.

FIG. 7 to FIG. 22 are drawings of various exemplary embodiments of a juice-extracting drum of the present invention. The first exemplary embodiment of a juice-extracting drum of the present invention may be applied to all of the juice extractor shown in FIG. 1 to FIG. 2.

FIG. 7 and FIG. 8 are exploded perspective views of a juice-extracting drum according to a first exemplary embodiment of the present invention. A first exemplary embodiment of a juice-extracting drum shown in FIG. 7 and FIG. 8 may be applied to a juice extractor shown in FIG. 1 to FIG. 2. As shown in FIG. 7 and FIG. 8, the juice-extracting drum 400 may include the inner module 10 and the outer module 20. Basically, the juice-extracting drum 400 of the present invention is composed of cylindrical two modules of the inner module 10 and the outer module 20 that are detachably assembled, and when two modules are combined, a narrow gap is formed lengthily such that juice extracted by the screw comes out therethrough.

The inner module 10 and the outer module 20 may be made integrally using Polyetherimide (PEI). The inner module 10 and the outer module 20 may be manufactured by injection.

The inner module 10 is in a generally cylinder shape, and the upper and lower sides may be open. The inner module 10 includes a plurality of bars 11 and a plurality of slits 12 is formed by a plurality of bars 11.

The outer module 20 is formed in an open cylindrical shape having the upper portion open such that the inner module 10 is surrounded and detachably coupled, and is formed with the rib 22 that is inserted into the slit 12 of the inner module 10 when combined with the inner module 10. If necessary, the lower portion may also be formed in an open cylindrical shape. The rib 22 is a rib-shaped protrusion including both lateral sides, a protrusion surface, an upper surface, and a lower surface, the protrusion surface, the upper surface, and the lower surface may be continuously formed without distinction from each other.

The rib 22 has a position and a shape corresponding to the slit 12 of the inner module 10 such that a predetermined fixed gap may be formed narrowly and lengthily with the slit 12 of the inner module 10 when the inner module 10 and the outer module 20 are coupled. When extracting juice, the juice comes out through the gap.

Although the width of the gaps is determined as needed in consideration of juice-extracting efficiencies of various materials and specific design constraints of module, the width of the gaps may be sufficient if debris may be filtered during the process of squeezing the juice. In addition, since juice-extracting is possible when the gap is a penetration hole elongated to cross the spiral of the screw 300 when the screw 300 is accommodated in the juice-extracting drum 400, it is not limited to any hole or any shape, the shape of the slit 12 is not limited to any shape, whether it is a hole in a bar shape or a hole in an egg shape.

In addition, in order that the inner module 10 may be smoothly coupled with or detachable from the upper side of the outer module 20, the upper portion of the outer module 20 is open, and the inner module 10 and the outer module 20 have a generally truncated conical shape that narrows down and the exterior diameter of the inner module 10 is formed smaller than the interior diameter of the outer module 20 such that the rib 22 of the outer module 20 is inserted into the slit 12 of the inner module 10 when the inner module 10 is accommodated in the outer module 20.

In addition, it is preferable to narrow the lower side gap of the juice-extracting drum 400, because more pressure is applied to the lower side of the juice-extracting drum 400 in the process of squeeze. Therefore, as shown in FIG. 7, the upper side width of the slit 12 may be narrower than the lower side width of the slit 12. That is, the width of the slit 12 may be narrower toward the upper side. In addition, the step portion 121 may be formed in the slit 12. With reference of the step portion 121, the upper side width of the slit 12 may be smaller than the lower side width of the slit 12.

In addition, as shown in FIG. 7 and FIG. 15, the width of the rib 22 of the upper portion side may be smaller than the width of the rib 22 of the lower portion side. That is, the width of the rib 22 may become narrower toward the upper side. In addition, the rib 22 may have a step portion 24 formed thereon. With reference of the step portion 24, the width of the rib 22 of the upper portion side may be smaller than the width of the rib 22 of the lower portion side.

Furthermore, the width of the rib 22 of the upper side of the step portion 24 may become narrower toward the upper side.

Meanwhile, on an interior circumference of an inner module 10 of a juice-extracting drum of the present invention composed of two modules, rib steps protruding in a vertical direction may be formed with a predetermined spacing.

The rib step may be divided into long and short ones, and may be divided into a first rib step 13 that is relatively short and has a lower protrusion height and a second rib step 14 that is relatively long and has higher protrusion height.

As the material is effectively moved from the upper portion to the lower portion of the inner module 10 by the screw and the second rib step 14, the compressive force is gradually increased. The juice generated by the squeeze of such compressive force is discharged while being filtered through the gap formed as rib 22 of the second module 20 is inserted into the slit 12 of the inner module 10, and therefore, effective juice-extracting is achieved. At this time, the material transferred to the lower portion while being squeeze is more finely crushed by a plurality of first rib steps 13 formed in lower portions of the second rib steps 14. At this time, the material is strongly pressed by the transporting compressive force applied to the material, juice is squeezed and discharged into the gap to increase the juice-extracting efficiency.

That is, the debris that occurs when the screw 300 is accommodated inside the inner module 10 and rotates to crush the juice-extracting target is sandwiched between the exterior surface of the screw 300 and the interior circumference of the inner module 10. At this time, the debris rotated by the torque of the screw 300 may hit the rib steps 13 and 14 and go down to the inner module 10.

In addition, the second rib step 14 may perform a function that reinforces the rigidity of the inner module 10, and may perform a function that guides the juice-extracting target to the lower portion of the juice-extracting drum 400. The inner module 10 has an overall thin thickness and the rigidity may be weakened by the slit 12. Therefore, by forming the second rib step 14 in the inner module 10, the rigidity of the inner module 10 may be reinforced. The function that the juice-extracting target is guided to the lower portion of the juice-extracting drum 400 by the second rib step 14 is as described above. In addition, the second rib step 14 may perform a function of fixing the accommodation position of the screw 300 in the juice-extracting drum 400 and fixing the juice-extracting space.

The first, second and rib steps 13 and 14 may perform the function of squeezing the material well with the screw 300 while bringing the juice-extracting target and the debris downward. Therefore, the first and second rib steps 13 and 14 do not necessarily have to be formed in the length direction of the juice-extracting drum 400, and may be implemented, in a shape crossing the spiral 310 of the screw 300, in an inclined shape with a predetermined slope with respect to the length direction for efficient transport and squeeze of the material.

Meanwhile, a plurality of bars 11 may include the bar 11 having a relatively narrow width and the bar 11 having a relatively wide width. In an exemplary embodiment of the present invention, a plurality of bars (e.g., three bars) having a relatively narrow width are disposed at equal intervals, and the bar having a relatively wide width may be disposed between the plurality of bars having a relatively narrow width disposed at equal intervals. At this time, the first rib step 13 may be formed in the interior circumference of the bar 11 having a relatively wide width, and the second rib step 14 may be formed in the interior circumference of bar 11 having a relatively wide width.

In addition, as shown in FIG. 7 and FIG. 8, in order to fix the coupling position of the inner module 10 and the outer module 20, a relatively narrow space and a relatively wide space between the plurality of ribs 22 may be formed. The bar 11 having a relatively wide width may be positioned in the space of relatively wide space between the plurality of ribs 22. The key protrusion 25 may be formed in a relatively wide space between the plurality of ribs 22.

FIG. 9 and FIG. 10 are perspective views of a juice-extracting drum according to a first exemplary embodiment of the present invention.

As shown in FIG. 9, the width (distance between a first slit and a second slit neighboring thereto along a circumferential direction) of the bar 11 between the slits 12 may have a shape that broadens toward the center of the radial direction of the inner module 10. For this purpose, the cross-section of the bar 11 may be a semicircle, ellipse, or trapezoid shape.

Referring back to FIG. 7, the key groove 15 may be formed in the exterior circumference of the inner module 10. For example, the key groove 15 may be formed in a generally triangle shape with reference of the cross-section of the inner module 10 in the up and down direction. The key groove 15 may be formed in the exterior circumference of the bar 11 having a relatively wide width.

The key protrusion 25 may be formed in the interior circumference of the outer module 20. The key protrusion 25 may be formed in a shape corresponding to the key groove 15 of the inner module 10. That is, the key protrusion 25 may be formed in a generally triangle shape with reference of the cross-section of the outer module 20 in the up and down direction, such that the key protrusion 25 protrudes from the upper surface of the outer module 20 and the protrusion amount is reduced downwards.

The coupling position of the inner module 10 and the outer module 20 may be fixed, by enabling the key protrusion 25 of the outer module 20 to be inserted into the key groove 15 of the inner module 10 when the inner module 10 is coupled to the outer module 20. In addition, by inserting the key protrusion 25 into the key groove 15, it is possible to limit the coupling position, relative rotation, and tilting of the inner module 10 and the outer module 20.

In addition, a cyclic first flange 16 may be formed in the lower side of bar 11. The first flange 16 supports the plurality of bars 11 such that the width of the slit 12 between the plurality of bars 11 to be fixed. As the comb tooth bar 11 is fixed by the first flange 16, the slit 12 forms penetration holes fixed by the upper surface, the lower surface, and the both lateral sides.

The bar 11 is formed like a cantilever elongated in the up and down direction, and the squeezing force between the screw 300 and the inner module 10 increases as it goes downward. Therefore, there is a possibility that the lower portion of the bar 11 may be deformed by the squeezing force between the screw 300 and the inner module 10. To prevent this problem from occurring, by supporting the lower portion of each bar 11 through the first flange 16, it is possible to prevent the width of the slit 12 from being changed by the squeezing force in the juice-extracting process.

Meanwhile, as shown in FIG. 8, the lower portion of the inner module 10 is formed with a seating portion 17 supported by the bottom surface of the drum housing 200. The seating portion 17 may be protruded to the lower side of the first flange 16 or formed as a groove drawn from the first flange 16 to the upper side.

Meanwhile, as shown in FIG. 7, the outer module 20 may be formed such that the interior diameter of each part of the outer module 20 is larger than the exterior diameter of a corresponding part of the inner module 10, so as to surround and join the inner module 10. The outer module 20 is in a generally cylinder shape, and the upper and lower sides may be open. The outer module 20 may include a plurality of first teeth 21.

On the interior circumference of the first tooth 21, the rib 22 may be formed by protruding in the radially interior direction.

A plurality of juice outlets 23 are formed by the plurality of first teeth 21. The rib 22 may be inserted into the slit 12 between the bars 11. By inserting the rib 22 into the slit 12, a predetermined gap may be formed between the slit 12 and rib 22. The size of the gap may or may not be uniform, and may not be limited to a shape if the rib 22 may be inserted into the slit 12 of the inner module 10 to form a gap therebetween that intersects the first spiral protrusion 310. Through the gap, the juice is discharged radially exterior direction of the juice-extracting drum 400, and debris separated from the juice may be collected in an inner lower portion of the juice-extracting drum 400.

The material is transferred to the lower side by rotation of the screw 300 within the inner module 10 of the juice-extracting drum 400, the material is gradually compressed to have smaller grains since the gap between the screw 300 and the interior circumference of the inner module 10 gradually narrows toward the lower side, and the compressive force due to the compression of the material becomes larger and larger toward the lower portion. Therefore, the lower portion-side gap of the juice-extracting drum 400 from which the juice is filtered may be formed narrower than the upper portion-side gap. In addition, depending on the material, discharge of juice through the lower portion-side gap may be hindered by debris generated in the juice-extracting process. Therefore, the upper portion-side gap of the juice-extracting drum may be formed relatively wide compared to the lower portion-side gap such that juice overflows through the upper portion-side gap. For example, when the width of the slit 12 between the bars 11 is constant, and the width of the rib 22 of the upper side of the step portion 24 becomes narrower toward the upper side of step portion 24, the size of the gap becomes wider toward the upper side with reference of the step portion 24.

In the case of a hard juice-extracting target such as a carrot, juice may be mostly discharged through a narrow gap formed in the lower side during the squeeze process. However, in the case of a soft juice-extracting target such as a tomato, juice may be discharged in the squeeze process, not only through the gap formed in the lower side, but also through a wide gap on the upper side, while the juice-extracting target stored in the gap formed in the lower side rises to the wide gap on the upper side. As such, if the size of the gap is not constant along the length direction (or up and down direction), the juice-extracting efficiency may be improved for both hard juice-extracting targets such as carrots and soft juice-extracting targets such as tomatoes.

The size of the gap may be maintained unchanged in the juice-extracting process. In addition, in the case of a hard juice-extracting target such as carrots, the gap may be stuck in the juice-extracting process. In this case, as shown in FIG. 7, the juice-extracting target is caught by the step portion 24, thus preventing the juice-extracting target from accumulating in the gap.

In addition, as shown in FIG. 17 to FIG. 18, a separation space may be formed between the exterior circumference of the inner module 10 and the interior circumference of the outer module 20. The separation space may be widened toward the lower side of the juice-extracting drum 400. By forming the separation space, a space to allow a flow of juice to be discharged through the gap between the slit 12 and the rib 22 may be secured. The inner module 10 may be formed in a cylinder shape whose diameter becomes smaller toward the lower side, such that the separation space may be widened toward the lower side of the juice-extracting drum 400. Alternatively, by forming a step with a narrowing diameter on the lower side of bar 11 of the inner module 10, the separation space may be widened toward the lower side of the juice-extracting drum 400 by the step.

In an exemplary variation embodiment for the juice-extracting drum shown in FIG. 9, a separation space is not formed between the exterior circumference of the inner module 10 and the interior circumference of the outer module 20, the exterior circumference of the inner module 10 and the interior circumference of the outer module 20 are assembled by being tightly contacting. When the exterior circumference of the inner module 10 and the interior circumference of the outer module 20 are in close contact, the size of the gap between the first slit 13 and the rib 22 may be effectively maintained to be constant since the inner module 10 and the outer module 20 may be maintained in close contact even if vibration is applied to the juice-extracting drum 400 in the juice-extracting process.

In addition, as shown in FIG. 7, a protruding portion 26 may be formed in the upper exterior circumference of the outer module 20. The protruding portion 26 may be seated on a coupling groove 210 formed in the interior circumference of the drum housing 200 shown in FIG. 3. Since the protruding portion 26 is seated on the coupling groove 210, the exterior circumference of the juice-extracting drum 400 may be maintained to be apart from the interior circumference of the drum housing 200, and the assemblability of the juice-extracting drum 400 and drum housing 200 may be improved. As shown in the drawings, four protruding portions 26 are formed at equal intervals in the circumferential direction at the upper end of the second module 20, and the coupling grooves 210 are formed at corresponding positions in the drum housing 200. Thereby, when the juice-extracting drum 400 is coupled to the drum housing 200, they may be easily assembled because it is convenient to visually identify.

Meanwhile, as shown in FIG. 7 and FIG. 9, a cyclic second flange 27 may be formed in the lower side of the first teeth 21. The first teeth 21 may be elongated to the lower side of the second flange 27. In addition, the bar 11 formed in the inner module 10 may be formed to extend to the lower side of the second flange 27 when the inner module 10 and the outer module 20 are assembled. That is, when the inner module 10 and the outer module 20 are assembled, regardless of the position of the second flange 27, in a total range of the slits 12 formed in the inner module 10, the rib 22 formed on the interior surface of the first teeth 21 may be inserted to form a predetermined gap between the slit 12 and the rib 22.

Meanwhile, as shown in FIG. 9, the first flange portion 16 may be extended in the radially interior direction than the interior circumference of the inner module 10, and a guide step 27-1 formed with an inclined protrusion may be provided on the upper surface of the first flange portion 16. At this time, the guide step 27-1 may be formed by extending from the second rib step 14 formed in the interior circumference of the inner module 10, and may be formed inclined in the rotating direction of the screw 300.

The debris of the juice-extracting target crushed between the screw 300 and the inner module 10 is moved downward by the first rib step 13 and the second rib step 14, and the guide step 27-1, formed of an inclined protrusion to allow the debris to move smoothly to the debris outlet 230, guides the debris to the debris outlet.

FIG. 11 to FIG. 14 are a first exemplary variation embodiment of the juice-extracting drum shown in FIG. 7 to FIG. 10. The first exemplary variation embodiment of the juice-extracting drum may be applied to the exploded perspective view of the juice extractor of FIG. 5 and FIG. 6.

Referring to FIG. 11 to FIG. 14, the first flange 16 to connect the lower portion of bar 11 of the inner module 10 is formed, and the coupling protrusion 19 is formed in the first flange 16 by protruding therefrom. The coupling protrusion 19 may be formed in a generally quadrangle shape, and the coupling protrusion 19 may be formed by extending at a bar 11 having a relatively wide width. The coupling protrusions 19 may be spaced apart at regular intervals in the circumferential direction to form a plurality (e.g., 4).

The second flange 27 is formed at the lower end of the outer module 20. The second flange 27 may be formed with an extension portion that extends in the radially interior direction of the outer module 20. The coupling groove 29 having a shape corresponding to the coupling protrusion is formed in the extension portion such that the coupling protrusion 19 of the inner module 10 is inserted.

When the inner module 10 assembled into the outer module 20, the coupling protrusion 19 is inserted into the coupling groove 29, such that the inner module 10 and the outer module 20 may be accurately combined.

In addition, the coupling protrusion 19 may substitute the function of the seating portion 17 shown in FIG. 8. When the coupling protrusion 19 is used as a seating portion, the coupling protrusion 19 may act such that the inner module 10 coupled with the outer module 20 is fixedly supported on the bottom surface of the drum housing 200. Therefore, the inner module 10 coupled with the outer module 20 may be seated and fixed in the drum housing 200.

The juice-extracting drum 400 shown in FIG. 11 to FIG. 14 may also be formed with the key groove 15 and the key protrusion 25 shown in FIG. 7 and FIG. 8.

That is, when the inner module 10 and the outer module 20 are assembled, the relative position of the lower portion of the inner module 10 and the outer module 20 may be primarily determined while the coupling protrusion is inserted into the coupling groove, and the relative position of the upper portions of the inner module 10 and the outer module 20 may be secondarily determined while the key protrusion 25 is inserted into the key groove 15, thereby fixing the coupling position of the inner module 10 and the outer module 20.

In addition, since the lower portions of the inner module 10 and the outer module 20 are combined by the coupling protrusion 19 and the coupling groove 29 and the upper portions of the inner module 10 and the outer module 20 are combined by the key protrusion 25 and the key groove 15, relative rotation between the inner module 10 and the outer module 20 is limited, and the inner module 10 and the outer module 20 may be prevented from tilting with respect to each other.

In an exemplary embodiment of the present invention, although it is described with an example that the coupling protrusion 19 is formed in the inner module 10 and the coupling groove 29 is formed in the outer module 20, the scope of the present invention is not limited thereto, and it may also be that the coupling protrusion 19 is formed in the outer module 20 and the coupling groove 29 may be formed in the inner module 10. In addition, although it is described with an example that the key groove 15 is formed in the inner module 10 and the key protrusion 25 is formed in the outer module 20, the key groove 15 may be formed in the outer module 20 and the key protrusion 25 may be formed in the inner module 10.

In addition, as shown in FIG. 12, a protruding portion 26 may be formed in the upper exterior circumference of the outer module 20. The protruding portion 26 is shown in FIG. It may be seated in the coupling groove 210 formed in the interior circumference of the drum housing 200 shown in 2. The protruding portion 26 may be seated on a coupling groove 210 formed in the interior circumference of the drum housing 200 shown in FIG. 2. Since the protruding portion 26 is seated on the coupling groove 210, the exterior circumference of the juice-extracting drum 400 may be maintained to be apart from the interior circumference of the drum housing 200, and the assemblability of the juice-extracting drum 400 and drum housing 200 may be improved. Preferably, as shown in the drawings, four protruding portions 26 are formed at equal intervals in the circumferential direction at the upper end of the second module 20, and the coupling grooves 210 are formed at corresponding positions in the drum housing 200. Thereby, when the juice-extracting drum 400 is coupled to the drum housing 200, they may be easily assembled because it is convenient to visually identify.

Referring to FIG. 12 and FIG. 15, the first rib step 13 is formed in the interior circumference of the inner module 10 by protruding therefrom, and the first rib step 13 may be formed adjacent to the slit 12. The first rib step 13 may be formed by extending in the radially interior direction from the edge formed in the up and down direction of slit 12. At this time, the height of the first rib step 13 may be longer than the width (or breadth) of the slit 12. In addition, the edge of the slit 12 facing the edge of the slit 12 formed in the first rib step 13 may be formed with an inclined portion 18.

For an explanation of the inclined portion 18, FIG. 14 is referenced. FIG. 14 is a cross-sectional view of the "A-A" portion shown in 13. FIG. 14 shows the juice-extracting drum seen from below.

Referring to FIG. 14, for a specific description of the position of the first rib step 13 and the inclined portion 18, the first rib step 13 is formed on the edge of the slit 12 that precedes, in the rotating direction, the screw 300 rotating inside the inner module 10, and the inclined portion 18 is formed in the edge of the slit 12 following the screw 300 in the rotating direction.

For example, if the screw 300 rotates anticlockwise inside the inner module 10, the first rib step 13 is formed by extending in the radially interior direction on the left-side edge of slit 12, and the inclined portion 18 may be formed in the right-side edge of the slit 12.

The rib 22 of the outer module 20 is inserted into slit 12, and a predetermined gap is formed between the slit 12 and the rib 22, such that the juice of the crushed juice-extracting target is discharged. At this time, the debris of the juice-extracting target may get stuck in the gap between the slit 12 and the rib 22.

However, the debris of the juice-extracting target may be prevented from being caught in the gap between the slit 12 and the rib 22 by the first rib step 13 and the inclined portion 18 formed in the slit 12.

Specifically, when the debris of the juice-extracting target crushed between the screw 300 and the inner module 10 while the screw 300 rotates inside the inner module 10 is small enough not to exceed the first rib step 13, the debris moves along the first rib step 13 to the lower side of the inner module 10.

As the amount of debris increases so as to exceed the first rib step 13, the debris goes over the first rib step 13 and moves to the adjacent first rib step 13 by the torque of the screw 300. By the height of the first rib step 13, the debris moves over the gap between the slit 12 and the rib 22 of the outer module 20 to the adjacent first rib step 13. When the debris moves over the first rib step 13, the debris moves to the adjacent first rib step 13 along the inclined portion formed on the edge of the slit 12 facing the first rib step 13, and therefore, the debris is prevented from getting caught in the gap between the slit 12 and the rib 22 of the outer module 20. In addition, the debris hitting the adjacent first rib step 13 moves along the adjacent first rib step 13 to the lower side of the inner module 10. In addition, the squeezing force applied to the gap formed between the slit 12 and the rib 22 is deteriorated in the process that the juice-extracting target moves over the first rib step 13, thereby minimizing debris from stuck in the gap.

Referring to FIG. 15, like the juice-extracting drum shown in FIG. 11 to FIG. 14, the first rib step 13 formed in the interior circumference of the bar 11 may be formed adjacent to the slit 12. When the first rib step 13 is formed adjacent to the slit 12, the first rib step 13 acts as a speed bump as in the juice-extracting drum 400 shown in FIG. 11 to FIG. 14, and accordingly, there is less debris in the gap than when the first rib step 13 is formed in the central portion of the bar 11. Details regarding thereto are the same as described above, and is not further described.

Figure 16:
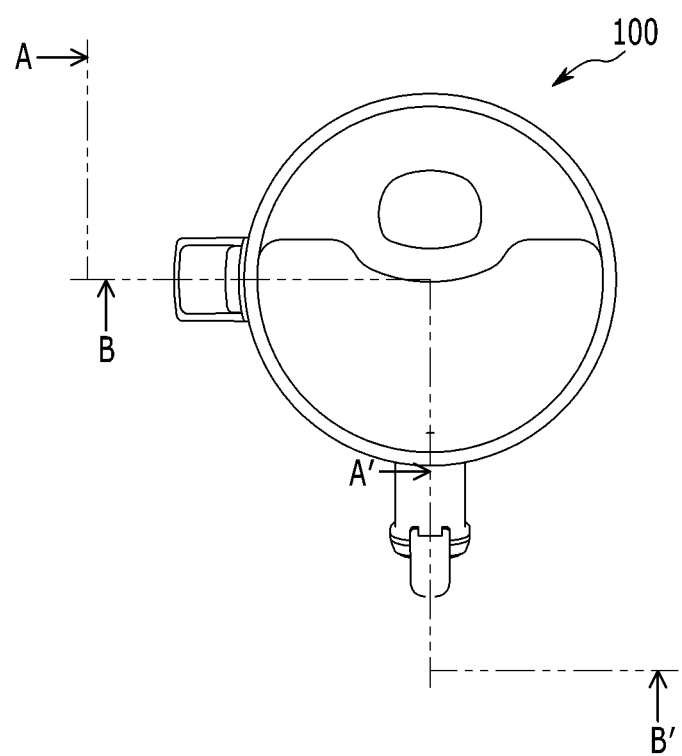
FIG. 16 to FIG. 18 are partial cross-sectional views of a housing assembly applied with a juice-extracting drum according to an exemplary embodiment of the present invention.

FIG. 16 to FIG. 18 are partial cross-sectional views illustrating that a juice-extracting drum of a first exemplary variation embodiment of the first exemplary embodiment is coupled with a drum housing. FIG. 16 is a juice extractor applied with a juice-extracting drum of the first exemplary variation embodiment, as viewed from above. FIG. 17 is a cross-sectional view in the "A-A" direction of FIG. 16. FIG. 18 is a cross-sectional view in the "B-B' direction of FIG. 16. At this time, the cross-sectional view in the "A-A" direction shows the cross-section toward the juice outlet 220, and the cross-sectional view in the "B-B" direction shows the cross-section toward the debris outlet 230. Therefore, referring to FIG. 17 and FIG. 18, a juice discharge path and a debris discharge path are illustrated to be visible.

Referring to FIG. 17, a discharge path of juice is clearly shown. When the material is inserted into the upper portion of the hopper 100, the screw 300 rotates and squeezes the material while transporting the material downward, and in the process, juice is discharged through the gap between the slit 12 of the inner module 10 and the rib 22 of the outer module 20.

The juice discharged through the gap moves downward, through the juice outlet 23 of the outer module 20, between the interior circumference of the drum housing 200 and the exterior circumference of the outer module 20, and flows in a juice discharge groove 297 formed at the bottom of the drum housing 200. In addition, juice is discharged through juice outlet 220 communicating with juice discharge groove 297 (see arrow of FIG. 17).

Referring to FIG. 18, the passage through which the debris pushed down through the gap between the inner module 10 and the screw 300 is discharged is well shown. The debris squeezed between screw 200 and the inner module 10 flows through the debris discharge groove 298 and is discharged through the debris outlet 230 communicating with the debris discharge groove 298 (see arrow in FIG. 18).

At this time, the debris does not move directly below the inner module 10 due to the second flange 27 extending in the radially interior direction at the lower end of the inner module 10, and the debris temporarily stays on the upper surface of the second flange 27. That is, the residence time of the juice-extracting target between the screw 200 and the inner module 10 increases, and thereby, the juice-extracting efficiency is increased because the juice-extracting target may be sufficiently juice-extracted.

In the present exemplary embodiment, debris discharge may be controlled by a debris discharger 238 attached with a packing.

In addition, as can be seen in this drawing, regarding the juice-extracting drum 400, the gap between the exterior diameter of the inner module 10 and the interior diameter of the outer module 20 becomes larger toward the lower side such that the juice passage space is formed wider toward the lower side.

Referring to FIG. 17, the drum hole 260 is formed in center of the interior bottom surface of the drum housing 200, a packing 261 for water resistance may be included at the interior circumference of the drum hole 260, and depending on the needs of the design, a cylinder that protrudes toward and is inserted into the central space inside the screw 300 may be included. A guiding step 290 where a lower end ring 390 of the screw 300 may be seated is formed around the drum hole 260. The guiding step 290 is formed at a predetermined height on the bottom surface of the drum housing 200 to be inserted into the interior circumference of the lower end ring 390 of the screw 300. While the lower surface screw is rotatably supported, the pressure of the debris or the juice drops and the debris or the juice does not enter the drive shaft.

In addition, a cyclic step 299 that may contact and be coupled with lateral side of the bottom flange portion of the inner module 10 coupled with the outer module 20 may be formed in the interior bottom surface of the drum housing 200, such that the debris may not be discharged to the juice discharge passage.

Figure 19:
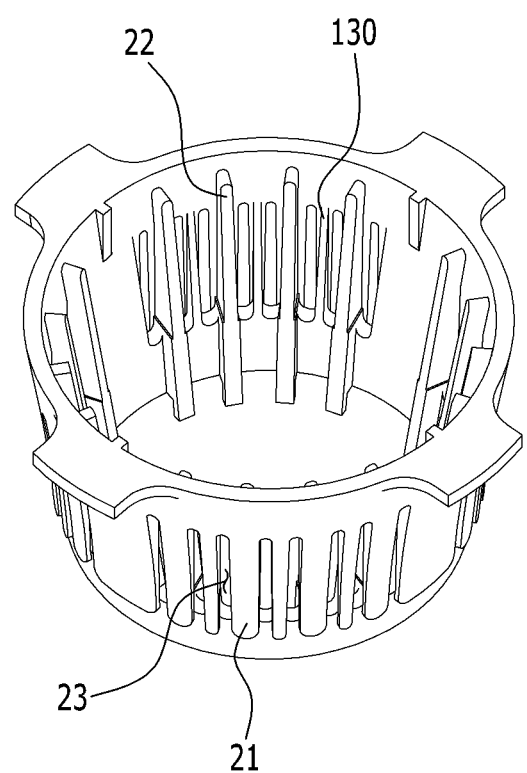
FIG. 19 is a perspective view of an outer module according to a still another exemplary variation of a juice-extracting drum according to an exemplary embodiment of the present invention.

FIG. 19 and FIG. 20 are still other exemplary variation embodiments of the juice-extracting drum shown in FIG. 7 or FIG. 11.

As shown in FIG. 19 and FIG. 20, the outer module 10 may further include a plurality of second teeth 130. The second teeth is another expression of the first teeth 21 including a protrusion portion protruded radially inward but called second teeth 130 to be clearly distinguished from the first teeth 21. The second teeth 130 may be formed between the ribs 22.

When the inner module 10 and the outer module 20 are combined, the second teeth 130 tightly contact the exterior circumference of bar 11. Therefore, the size of the gap between the first slit 13 and the rib 22 may be effectively maintained to be constant since the second teeth 130 and the bar 11 may be maintained in close contact even if vibration is applied to the juice-extracting drum 400 in the juice-extracting process.

Figure 21:
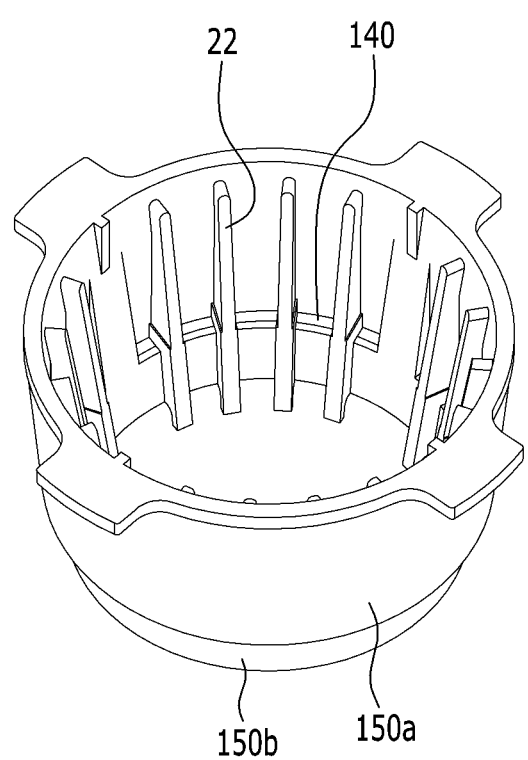
FIG. 21 is a perspective view of an outer module according to a still another exemplary variation of a juice-extracting drum according to an exemplary embodiment of the present invention.
Figure 22:
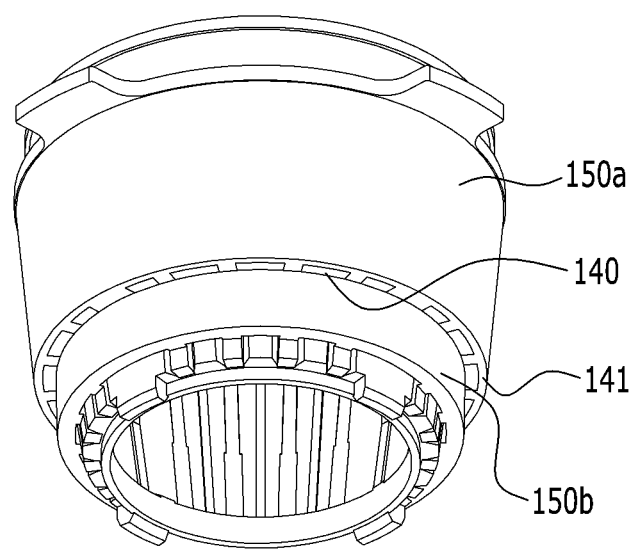
FIG. 22 is a still another exemplary variation of a juice-extracting drum of the present invention applied with the outer module of FIG. 21.

FIG. 21 and FIG. 22 are still other exemplary variations of the juice-extracting drum shown in FIG. 7 or FIG. 11.

As shown in FIG. 21 and FIG. 22, a juice discharging hole 140 may be formed in the middle portion of the outer module 20. The first teeth 21 and the juice outlet 23 are not formed in the outer module 20 shown in FIG. 12A and FIG. 12B. That is, the outer module 20 is formed in a normal cylinder shape without opening in the exterior circumference. Instead, the outer module 20 is formed in a double-sided cylinder shape in which the diameter of the lower portion is smaller than the diameter of the upper portion, and a step surface 141 is formed between the upper cylinder 150*a* and the lower cylinder 150*b*. The juice discharging hole 140 is formed on the step surface 141. In addition, the rib 22 is protruded in the radially interior direction in the interior circumference of the outer module 20. Accordingly, the juice discharged from the gap in the upper portion of the juice discharging hole 140 may be discharged through the juice discharging hole 140. At this time, the exterior circumference of the outer module 20 has no holes, thus preventing juice from splashing on the interior surface of the drum housing 200.

Meanwhile, it is exemplified so far that slits are formed in the inner module and ribs are formed in the interior circumference of the outer module. However, from the description so far, it may be understood that the same function may be performed even if the rib is formed in the outer circumference of the bar of the inner module by protruding in the radially exterior direction and the rib is inserted into the juice outlet 23 in the outer module.

According to the first exemplary embodiment of the present invention, the juice-extracting drum may be easily cleaned and the juice-extracting efficiency may be improved.

In addition, according to the first exemplary embodiment of the present invention, it is possible to smoothly transfer the material by screw in the squeezing process, to increase the juice-extracting rate through fine crush and squeeze of the material, and to smoothly insert the material.

In addition, according to the first exemplary embodiments of the present invention, it is possible to prevent the problem of debris hindering the flow of the extracted juice by preventing debris from being caught in the juice-extracting drum in the juice-extracting process.

In addition, according to the first exemplary embodiments of the present invention, it is possible to prevent deformation of the juice-extracting drum in the juice-extracting process by forming the juice-extracting drum from a rigid material. Accordingly, it is possible to prevent the slit from being widened, and to maintain a constant gap of slit from which juice is discharged.

In addition, according to the first exemplary embodiments of the present invention, it is easy to assemble and disassemble the juice-extracting drum in the juice extractor and facilitate the production of the juice-extracting drum.

As described above, according to an exemplary embodiment of the present invention, by configuring the juice-extracting drum 400 composed of two modules, cleaning is easy and juice-extracting efficiency may be improved.

As described above, a juice-extracting drum according an exemplary embodiment of to the present invention is configured to combine two modules in an up and down direction, and assembly and disassembly of the two modules becomes easy and cleaning becomes easy.

In addition, the debris is prevented from being stuck in the gap formed between the two modules by the first rib step and the inclined portion formed in the first slit, thereby improving the juice-extracting efficiency.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vertical low-speed juice-extracting drum that separates juice and debris in a crushing and squeezing process of a juice-extracting target by a screw rotating inside, the vertical low-speed juice-extracting drum comprising:
   an inner module formed as a hollow cylinder with an upper portion open to accommodate the screw, the crushing and squeezing process of the juice-extracting target by an interaction with the screw, the inner module further formed with a plurality of slits formed as penetration holes having both lateral sides, an upper surface, and a lower surface above the upper portion and a lower portion along an interior circumference; and
   an outer module having an upper portion open to be detachably coupled to the inner module, and formed with a rib formed by protruding in a radially interior direction on an interior circumference and including a protrusion surface, an upper surface, and a lower surface,
   wherein the rib of the outer module is inserted into the slit of the inner module when the outer module surrounds and combines the inner module and a fixed gap discharging juice extracted by the interaction of the screw with the inner module is formed lengthily in an up and down direction between the lateral side of the slit of the inner module and a lateral side of the rib of the outer module,
   wherein a width of the fixed gap is formed such that debris is filtered during the squeezing of the crushing and squeezing process of the juice-extracting target, and
   wherein the fixed gap is formed in a direction intersecting a screw blade.

2. The juice-extracting drum of claim 1, wherein rib steps protruding in the radially interior direction are formed at predetermined spacing in the interior circumference of the inner module.

3. The juice-extracting drum of claim 2 wherein the rib step is formed adjacent to a lateral edge of an upstream side slit in a screw rotating direction of the slit of the inner module.

4. The juice-extracting drum of claim 3, wherein an inclined portion is formed by cutting off the lateral edge in the slit of the inner module at a downstream side in a screw rotating direction.

5. The juice-extracting drum of claim 4, wherein the rib step is formed on the edge of the slit preceding the screw in the rotating direction, and the inclined portion is formed in the edge of the slit following the screw in the rotating direction.

6. The juice-extracting drum of claim 2, wherein the rib step comprises:
   a first rib step having a relatively short length and a relatively low protrusion height; and
   a second rib step having a relatively long length and a relatively high protrusion height.

7. The juice-extracting drum of claim 6, wherein:
   the protrusion height of the second rib step has a same height from the upper portion to the lower portion of the inner module, or
   the protrusion height of the second rib step is formed to gradually decrease from the upper portion to the lower portion of the inner module.

8. The juice-extracting drum of claim 7, wherein the second rib step slopes downward from the upper portion to the lower portion of the inner module, and a stepped portion is formed in a middle portion.

9. The juice-extracting drum of claim 6, wherein the first rib step is formed adjacent to an upstream side edge of the slit with respect to a rotating direction of the screw.

10. The juice-extracting drum of claim 6, wherein a spiral guide step extending from the second rib step is formed on a upper surface of a cyclic flange extending in the radially interior direction at a lower end of the inner module.

11. The juice-extracting drum of claim 1, wherein:
an exterior surface of a wide width bar in which the slit is not formed is formed in the inner module; and
a guiding surface corresponding to the exterior surface and not formed with the rib is formed inside the outer module.

12. The juice-extracting drum of claim 11, wherein a width of the bar is formed to be wider toward the radially interior direction, and a width of the gap formed between the slit of the inner module and the rib of the outer module is wider toward the radially exterior direction.

13. The juice-extracting drum of claim 1, wherein:
a step portion is formed in the slit of the inner module; and
a width of an upper side slit is narrower than a width of a lower side slit, with reference of the step portion, or wherein a step portion is formed on the rib of the outer module; and a width of a lower side rib is wider than a width of an upper side rib, with reference of the step portion.

14. The juice-extracting drum of claim 1, wherein a space formed between an exterior circumference of the inner module and the interior circumference of the outer module gradually widens toward the lower portion.

15. The juice-extracting drum of claim 1,
wherein the rib is provided in plural, and
wherein a plurality of juice outlets are formed between the plurality of ribs of the outer module.

* * * * *